(12) United States Patent
Dew, Jr.

(10) Patent No.: US 7,374,676 B2
(45) Date of Patent: May 20, 2008

(54) HIGH RATE FILTRATION SYSTEM

(75) Inventor: William Frederick Dew, Jr., Homewood, AL (US)

(73) Assignee: Schreiber, LLC, Trussville, AL (US)

( * ) Notice: Subject to any disclaimer, the term of this patent is extended or adjusted under 35 U.S.C. 154(b) by 0 days.

(21) Appl. No.: 10/661,349

(22) Filed: Sep. 12, 2003

(65) Prior Publication Data

US 2004/0140256 A1    Jul. 22, 2004

Related U.S. Application Data

(63) Continuation of application No. 10/098,738, filed on Mar. 15, 2002, now abandoned, which is a continuation of application No. 09/627,638, filed on Jul. 28, 2000, now abandoned, which is a continuation-in-part of application No. 08/980,537, filed on Dec. 1, 1997, now abandoned.

(60) Provisional application No. 60/032,643, filed on Dec. 10, 1996.

(51) Int. Cl.
*B01D 24/26* (2006.01)

(52) U.S. Cl. .............. 210/269; 210/274; 210/291; 210/350; 210/496

(58) Field of Classification Search ............ 210/745, 210/792, 85, 96.1, 264, 269, 274, 284, 290, 210/350, 351, 291, 496
See application file for complete search history.

(56) References Cited

U.S. PATENT DOCUMENTS

| | | | |
|---|---|---|---|
| 847,518 A | 3/1907 | Shiltz | 210/289 |
| 2,954,873 A | 10/1960 | Davis | 210/333.1 |
| 4,123,356 A | 10/1978 | Sugimoto et al. | 210/798 |
| 4,157,959 A * | 6/1979 | Wen et al. | 210/807 |
| 4,743,382 A | 5/1988 | Williamson et al. | 210/786 |

(Continued)

FOREIGN PATENT DOCUMENTS

DE    312993    6/1919

(Continued)

OTHER PUBLICATIONS

Coliskaner et al, "Evaluation of the Fuzzy Filter for the Filtration of Secondary Effluent", Sep. 1996, Department of Civil and Environmental Engineering, University of California, Davis.*

(Continued)

*Primary Examiner*—Matthew O. Savage
(74) *Attorney, Agent, or Firm*—Paul F. Pedigo; Summa, Allan & Additon, P.A.

(57) ABSTRACT

A high rate, upflow filtration system is described in which a compressible, fibrous lump filtration media is compressed to adjust the porosity and collector size of the media in the bed and to provide a porosity gradient within the bed proceeding from more porous to less porous in a direction opposite to the flow of fluid so that filtration proceeds in a direction from a more porous to a less porous filter bed. Larger particles are removed by the more porous media and successively smaller particles are removed as the filter bed becomes less porous. The system is capable of reducing the turbidity of influent municipal wastewater from about 8 NTU to about 2 NTU at a wastewater flow rate of from about 820 to 1230 L/m$^2$·min (20 to 30 gal/ft$^2$·min), at a bed compression ration of from about 15 to 40 percent, and at a backwash rate of from about 1 to 6 percent based on the total wastewater passing through the filter.

10 Claims, 24 Drawing Sheets

U.S. PATENT DOCUMENTS

| | | | | |
|---|---|---|---|---|
| 4,776,962 A | 10/1988 | Wakeman | ................... | 210/748 |
| 5,248,415 A | 9/1993 | Masuda et al. | ............. | 210/154 |
| 5,362,384 A * | 11/1994 | Whetsel | ....................... | 210/85 |

FOREIGN PATENT DOCUMENTS

| | | |
|---|---|---|
| JP | 59 036513 | 2/1984 |
| JP | 1-249113 | 10/1989 |
| JP | 06182115 A | 7/1994 |
| JP | 06254318 A | 9/1994 |
| WO | WO 00/43097 * | 7/2000 |

OTHER PUBLICATIONS

Database WPI Week 9331, Derwent Publications Ltd., London, GB; AN 93248, XP00206194 & SU 1 754 159 A, Aug. 15, 1992.

Declaration of William F. Foreman, III, P.E., Under Rules 56 and 132, executed Aug. 30, 2006.

Columbus, Georgia CSO Treatment Facilities, Uptown Park Water Resources Facility; Paula K. Gurney, Mark Boner; from PTO/SB/08B filed Nov. 27, 2006 in U.S. Appl. No. 11/036,763 filed Jan. 14, 2005; 6 pp (unnumbered).

* cited by examiner

HIGH RATE FILTRATION SYSTEM

CROSS REFERENCE TO RELATED APPLICATION

This application is a continuation of U.S. application Ser. No. 10/098,738, filed Mar. 15, 2002 now abandoned, which is a continuation of U.S. application Ser. No. 09/627,638, filed Jul. 28, 2000 now abandoned, which is a continuation-in-part of U.S. patent application Ser. No. 08/980,537, filed Dec. 1, 1997 now abandoned, which is incorporated herein in its entirety and which claims the benefit of U.S. Provisional Application No. 60/032,643, filed Dec. 10, 1996.

FIELD OF THE INVENTION

This invention relates to filtration systems, including filtration systems used in connection with tertiary treatment of wastewater for reduction of suspended solids.

BACKGROUND OF THE INVENTION

Disposal and reuse of wastewater from raw municipal sewage is problematic. Stringent wastewater treatment requirements have been promulgated to protect human health, particularly in those areas having limited water supply or dense populations. For example, Title 22 of the California Administrative Code establishes stringent water reuse criteria where human contact is likely to occur with treated wastewater.

Typically, wastewater is disinfected by chlorination or ultraviolet irradiation where the treated wastewater is discharged to inland surface waters. Disinfection of this type typically achieves complete destruction of pathogenic bacteria and substantial deactivation of viruses, but does not provide complete virus destruction. Viruses have been detected in secondary effluents.

Title 22 of the California Administrative Code is directed to tertiary treatment requirements. Viral monitoring is not specified in Title 22 because viruses typically occur in low concentrations in treated wastewater. Viral monitoring is expensive. Viral assays require special expertise. Laboratory procedures usually are off line and time consuming. Analytical costs are high. Therefore, instead of imposing measurements of viral concentrations, Title 22 sets forth a tertiary treatment system that consists of chemical coagulation, sedimentation, filtration, and disinfection where the public may exposed to the treated wastewater, as in a recreational impoundment.

Under the provisions of Title 22, turbidity of the treated effluent normally cannot exceed an average operating value of 2 NTU after final filtration, and cannot exceed 5 turbidity units more than 5 percent of the time during any 24 hour period. Chlorination after this level of treatment typically insures effective virus destruction sufficient for the protection of public health. Direct filtration with chemical addition is allowed as an alternative to the complete treatment systems specified in Title 22 where it has been demonstrated that the results of the two treatment systems are comparable and meet the appropriate criteria.

It has been determined that disinfection rates typically correlate well with wastewater particle size distributions and that the ability to inactivate an individual wastewater particle is a function of the size of the particle. Direct tertiary filtration alone usually does not enhance the rate of disinfection unless the particle size distribution of the settled wastewater is modified. Tertiary filtration systems that operate to remove larger size particles should safely reduce the long contact times and high chlorine dosages typically employed in wastewater reclamation processes. Accordingly, granular filtration media is almost universally required as a part of wastewater reclamation. Granular filtration is somewhat time consuming and can be the limiting factor for a wastewater treatment system.

Masuda et al. U.S. Pat. No. 5,248,415 discloses an upward flow filtration apparatus that is said to be useful as a tertiary filter for wastewater treatment systems and to operate at a relatively high flow rate. An embodiment of the subject matter described in the Masuda patent is represented in FIG. 24 generally at 28 and is labelled Prior Art.

The filtration media described in the Masuda patent comprise a plurality of crimpy fibrous lumps. The fibrous lumps are disposed in the upward flow filtration apparatus 28 between first and second perforated panels 36 and 38, respectively. The wastewater flows in an upward direction through the fibrous lumps and suspended matter is captured by the individual fibrous lumps.

The first perforated panel 36 is immovably mounted within the apparatus and the second perforated panel 38 is movably mounted within the apparatus and spaced below the first perforated panel. The lower movable perforated panel 38, or bottom plate, is raised to compress the fibrous lumps to eliminate air gaps and to form a dense filter layer. The wastewater passes upwardly through the movable bottom plate and the filter layer and exits the top immovable plate 36. Fine solid materials in the upward flow are said to progressively adhere to the filter layer from the lower portion to the upper portion thereof in that order. With progressive filtration, resistance to filtration is increased. The movable bottom plate is lowered from time to time and is said to define a cleaning chamber when the filtration performance is reduced and it becomes necessary to clean the fibrous lumps.

However, the apparatus described in the Masuda et al. patent with the movable bottom plate has some difficulties associated with it. A ram or screw 40 for moving the bottom plate passes through the wastewater, the media, and the top stationary plate 36. The screw decreases the amount of room available for the media and potentially causes some channeling through the media in the region of the screw. The media are constructed of a loose fiber and can become entangled in the screw as it turns. A seal is used where the screw passes through the top plate, further complicating the operation of the device.

When the bottom plate is moved to compress the media, the lower layers of media become compressed. The compressed filter media in the lower portion of the bed is then the first portion of the media to contact the wastewater since the filter is operated in an upflow mode. The filter clogs up fast because large particles and fines are both trapped by the compressed initial layers of the filter media. The entire unit is shut down, usually before the upper filter layers are fully loaded, and the filter media is washed before the next cycle is begun.

The filter media is washed by moving the bottom plate downwardly away from the media to define a cleaning chamber. However, the flow rate of the wash water makes it difficult to achieve separation between the media and to obtain efficient cleaning. The Masuda device has typically required washing of the filter media on a frequent basis at a full flow rate of wash water equivalent to the flow rate of wastewater. Thus the overall efficiency of the apparatus described in the Masuda patent is greatly reduced.

It would be desirable to develop a filtration system suitable for tertiary wastewater treatment that substantially reduced or eliminated at least some of the problems associated with the Masuda device and yet provided a high rate filtration system as a suitable alternative to granular filtration media.

SUMMARY OF THE INVENTION

The invention provides a high rate filtration system in which the collector size and effective pore size of the filtration media can be adjusted according to influent conditions and to promote efficient cleaning of the media. The fluid travels through successive layers of filter media in which each layer becomes progressively more compressed with a smaller effective pore size and collector size for filtration and removes smaller and smaller particles. The compression gradient promotes more uniform loading of the media throughout the filter bed. The compression gradient can be altered during filtration to adjust head loss across the media and to extend the time for filtration while maintaining filtration efficiency within acceptable limits.

When used for sewage treatment, effluent turbidity values of 2 NTU or lower can be achieved without chemical addition for influent turbidity values of up to approximately 8 NTU when the flow is from about 820 to 1230 L/m$^2$·min (20 to 30 gal/ft$^2$·min) at a bed compression ratio of from about 15 to 40 percent. The percentage of backwash water required at filtration rates of 820 and 1230 L/m$^2$·min (20 to 30 gal/ft$^2$·min) and at bed compression values of from 20 and 30 percent is from about 1 to 3 percent.

Depending on the influent quality and the desired effluent quality, the filtration system of the invention should be operable at increased flow rates above 1230 L/m$^2$·min (30 gal/ft$^2$·min) so long as the head loss across the filter does not result in uneconomical operation. Flow rates of 1640 L/m$^2$·min (40 gal/ft$^2$·min) to 2050 L/m$^2$·min (50 gal/ft$^2$·min) or more should be useful, depending on the results desired.

The filtration apparatus of the invention is suitable for a wide variety of fluid/solid separations, including reducing suspended solids in municipal and industrial wastewater, recovery of machine shop working fluids, and a host of other separations. Compressible fibrous lump filter media as described in Mausda et al. U.S. Pat. No. 5,248,415 are contained between upper and lower perforated panels in which, for operation in the upflow mode, the upper panel, or top plate, is movable to adjust the porosity and collector size of the media. A gradient of porosity is established across the filter bed in which the porosity is increased from top to bottom, which is opposite the direction of fluid flow.

The fluid to be filtered enters filter media at the less compressed bottom in the upflow mode. Larger particles are trapped in the lower portion of the bed where the fluid enters. Smaller particles travel through to successive layers of filter media. The final upper layer of filtration media removes the smallest particles for which filtration is provided. The compressed layer of filter media at the top clogs less frequently than when the bottom layer of filter media is compressed because the top layer filters only the fines and not the large size particles in addition.

The high rate filtration system of the invention typically is offstream less frequently and requires less washing of the media than prior apparatus. Filtration efficiency is comparable to that of other filters, but at filtration flow rates that typically are many times faster.

There is no necessity to provide a seal in an upper movable plate for a ram or screw that is designed to move the lower movable plate. Channelling can be reduced and the filter bed is not interrupted. There is no mechanical means in which the media can become entangled.

Several cells can be built into each of the filters that can be independently controlled so that one filter cell can be shut down and cleaned while another is operating. The wash cycle can be done at a relatively low flow rate with less water to be recycled, which means that the process can be run efficiently.

The foregoing and other objects, advantages and features of the invention, and the manner in which the same are accomplished, will be more readily apparent upon consideration of the following detailed description of the invention taken in conjunction with the accompanying drawings, which illustrate preferred and exemplary embodiments, and wherein:

BRIEF DESCRIPTION OF THE DRAWINGS

FIG. 3A represents an upflow filtration mode, FIG. 3B represents an upflow washing mode for cleaning the filter media, and FIG. 3C represents an upflow flushing mode for removing remaining loose material from the filter bed prior to initiating a filtration mode;

FIG. 24 is a representation of the prior art high speed filtration system described in Masuda et al. U.S. Pat. No. 5,248,415.

DETAILED DESCRIPTION OF THE INVENTION

Figure 1:
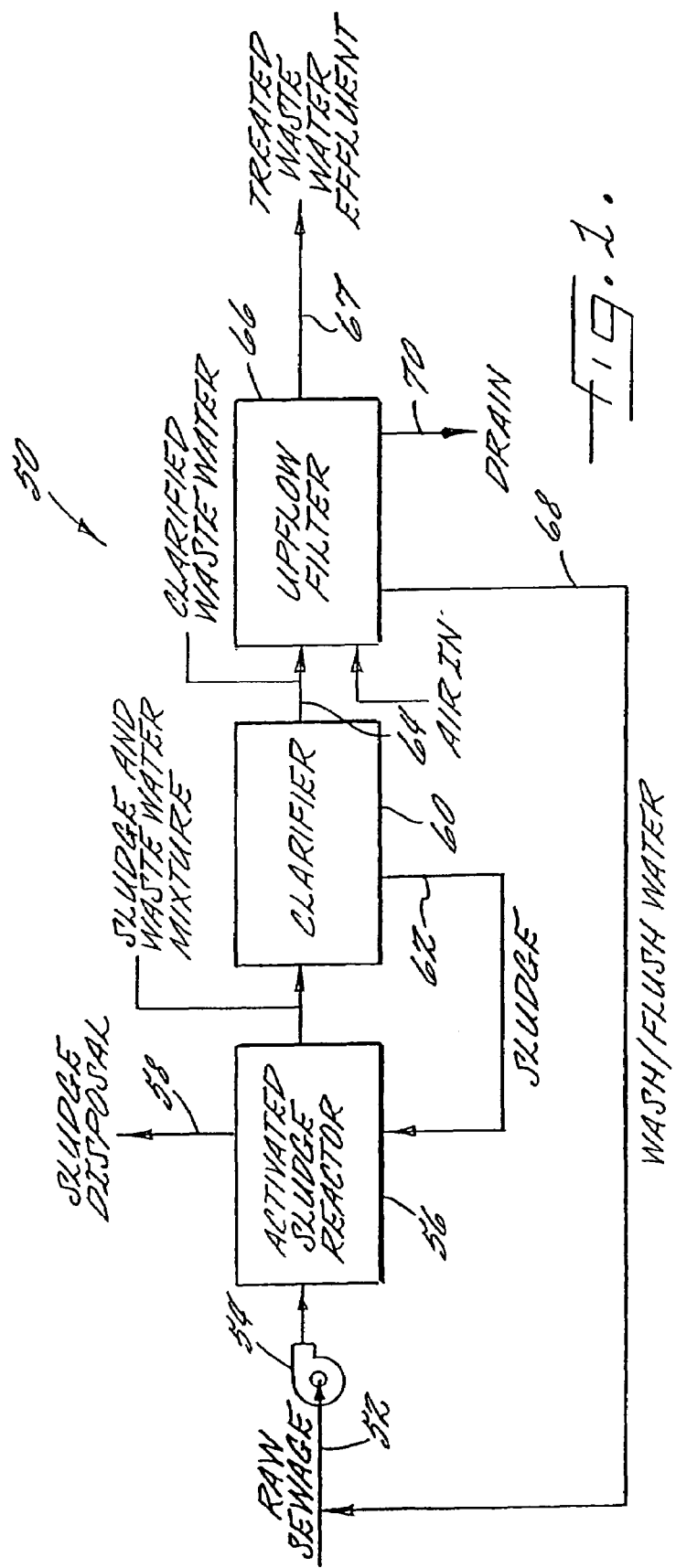
FIG. 1 is a schematic drawing of a representative activated sludge plant that includes the tertiary treatment system in accordance with the invention.

Represented in FIG. 1 generally at 50 in highly schematic form is a representative activated sludge plant incorporating the filtration apparatus of the invention for tertiary treatment of raw municipal sewage for increased removal of suspended solids. It should be recognized that the configuration of the activated sludge plant as represented is but one example of an activated sludge plant and that numerous alternatives are available. It should also be recognized that, while the invention is described in the context of a tertiary treatment system for municipal sewage that is treated by an activated sludge process, the invention described herein is not so limited.

The invention is not limited to particular configurations or modes of operation of activated sludge plants, or to use in connection with an activated sludge plant. For example, the filtration apparatus of the invention can be used to treat wastewater that is not subjected to sludge digestion. Where it is desired to use the wastewater for its nutrient content, as in fertilizer, then the wastewater may be subjected to primary clarification prior to filtering in an apparatus of the invention and in the absence of sludge digestion. The wastewater may be screened and subjected to a swirl separator to remove large non-suspended solids, including cups, rags, boards, and other trash, prior to filtering in an apparatus of the invention.

The invention is not limited to the treatment of sewage or other municipal or industrial wastewater. On the contrary, the invention described herein should normally be useful in connection with a wide variety of filtration processes in which solids of appropriate particle size for the effective pore size of the media are removed from fluids that are compatible with the media, including both liquids and gases. For example, the filtration apparatus of the invention should be useful as a prefilter for removing small solid particles from seawater that otherwise could foul a reverse osmosis membrane in processes for producing fresh water from salt water. Machine shop working fluid, hydraulic fluids, and various petroleum or food oils should be usefully treated by the filtration apparatus of the invention to economically and efficiently remove small particles therefrom.

Accordingly, while the invention will be described in detail in the context of reducing suspended solids in wastewater in connection with the activated sludge process, it should be understood that the detailed description is for purposes of illustration and not of limitation. Various modifications and changes may be made and the invention is subject to a number of applications without departing from the scope of the invention as set forth in the appended claims.

Returning to FIG. 1 and the activated sludge plant represented at 50, wastewater, including, for example, raw municipal sewage, is collected and pumped through a conduit 52 by a pump 54 to enter an activated sludge reactor 56 for digestion by the biological sludge contained within the reactor of carbonaceous organic compounds, nitrates, and phosphates in a manner believed to be well known to the skilled artisan. Spent or excess sludge is withdrawn through a conduit 58 for disposal. The activated sludge reactor can be a single tank reactor wherein oxic, anoxic, and anaerobic phases of the reaction can occur sequentially in the single tank. These reactions can also take place in separate tanks. Sludge digestion is sometimes referred to as primary treatment of the wastewater.

The mixture of activated sludge and treated wastewater is then typically sent to one or more clarifiers 60 for gravity separation of the sludge from the treated wastewater, which is sometimes referred to as secondary treatment. The separated sludge is usually recycled from the clarifier to the activated sludge reactor through a conduit 62. The clarified effluent 64 becomes the influent wastewater for a tertiary treatment system if tertiary treatment is used for further reduction of suspended solids.

The high rate upflow filtration system of the invention, represented at 66, is useful as a tertiary filtration system and receives as influent the secondary effluent 64 from a clarifier 60 for further reduction in suspended solids. The filtered effluent 67 from the high rate filtration system 66 can be further treated with chlorine or ultraviolet light, as necessary, and disposed of to a creek or water reservoir.

The filter 66 is washed from time to time with its own influent received through conduit 64, as described below, to clean the filter and remove the suspended solids trapped by the filter. Normally, the wash water will then be recycled through a conduit 68 to the influent 52 to the activated sludge reactor and mixed therewith. A drain 70 is also provided on the filter, which usually drains to a sewer, if it becomes necessary to drain the filter off stream from the return conduit 68.

Figure 2:
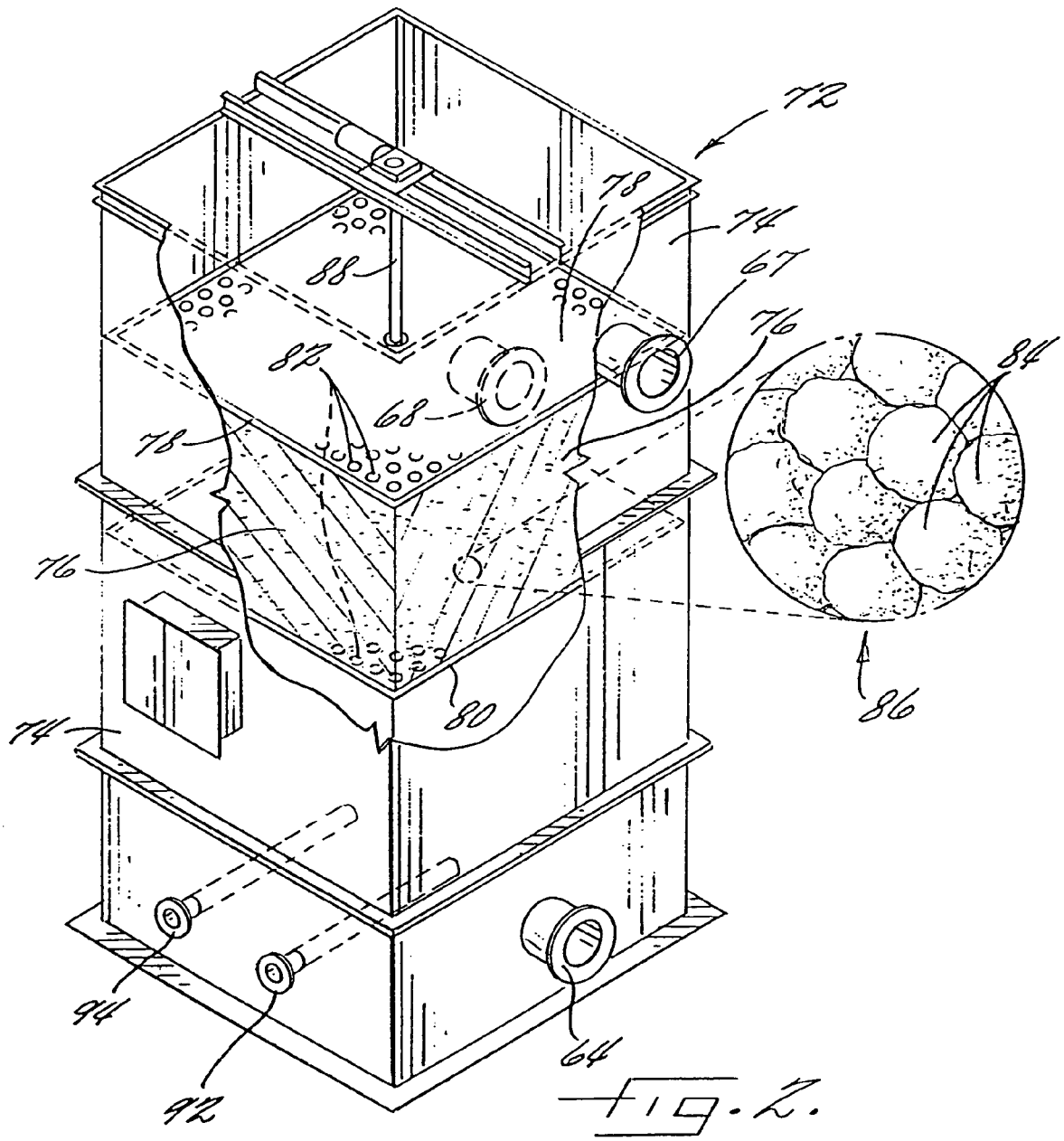
FIG. 2 is a partially cutaway perspective view of a filtration apparatus in accordance with the invention.

A filtration system of the invention is represented in a cutaway perspective view generally at 72 in FIG. 2. The filtration system includes a housing 74 and a filtration bed 76 contained within the housing between two perforated plates, a movable upper plate 78 and a fixed lower plate 80. The perforated plates contain a plurality of apertures 82 through which wastewater can enter and exit the filter bed. The apertures are sized to permit the wastewater freely to enter and exit the filter bed while substantially precluding the individual filter media components 84 from being displaced outside the filter bed. The individual filter media components 84 are illustrated in an enlarged perspective view generally at 86.

The upper plate 78 is a vertically movable plate and its movement up and down is actuated by a piston 88 disposed above the plate. The plate is moved as necessary to control the degree of compression of the filter media in the bed. As should be recognized by the skilled artisan, the mechanism for moving the upper plate up and down can be designed to avoid extending substantially above the top most portion of the filter housing, which can reduce the free vertical space needed to accommodate the filter.

Figure 3A:
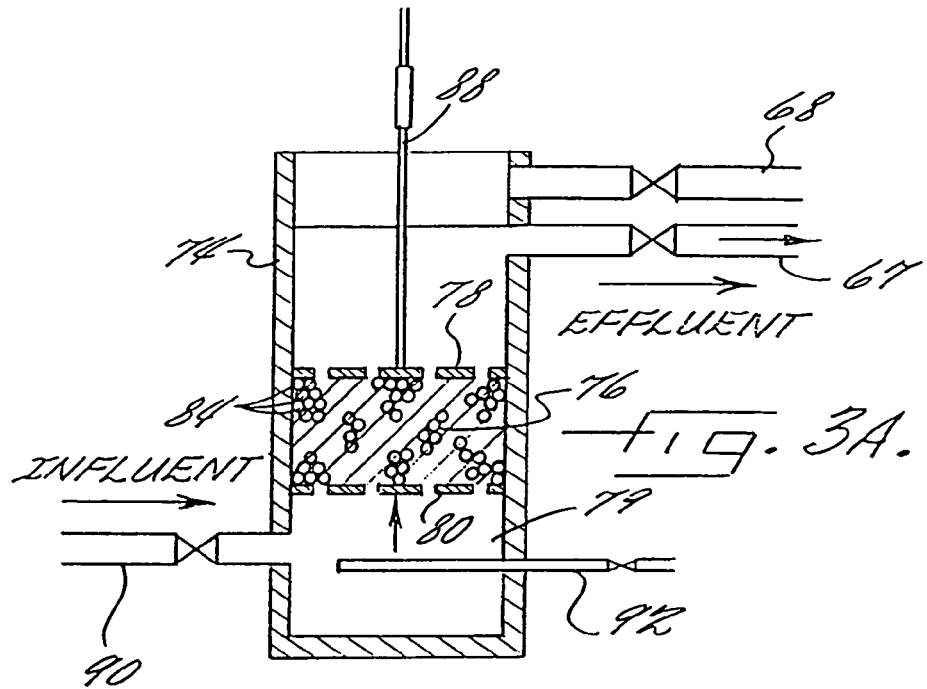
FIGS. 3A through 3C are longitudinal schematics in cross section representing the filtration apparatus of FIG. 2 in three different modes of operation.
Figure 3B:
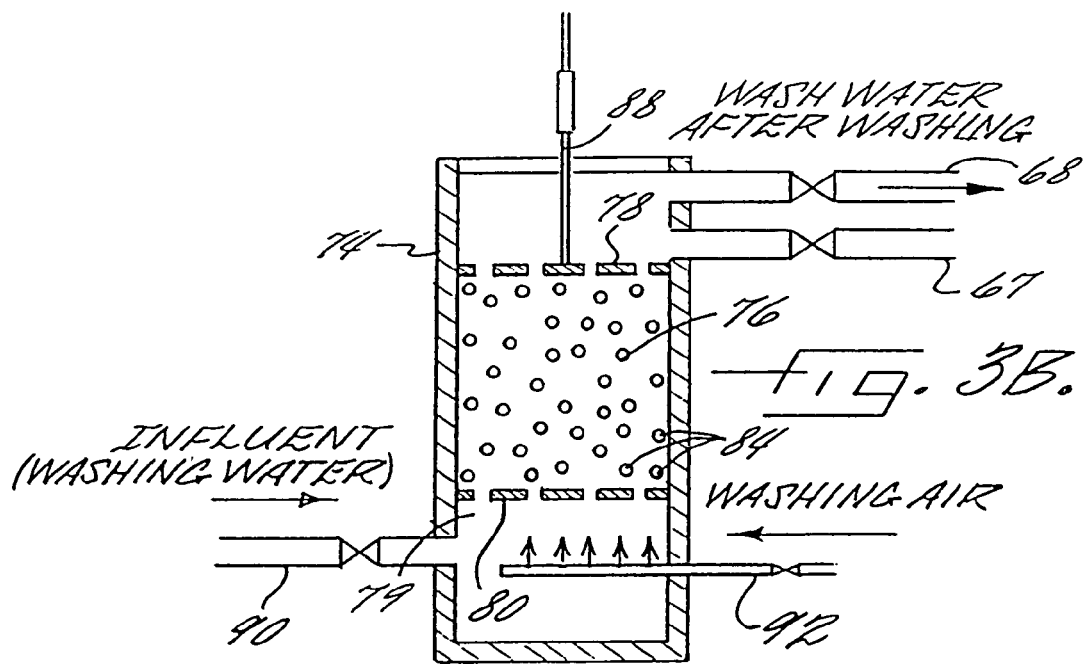
Figure 3C:
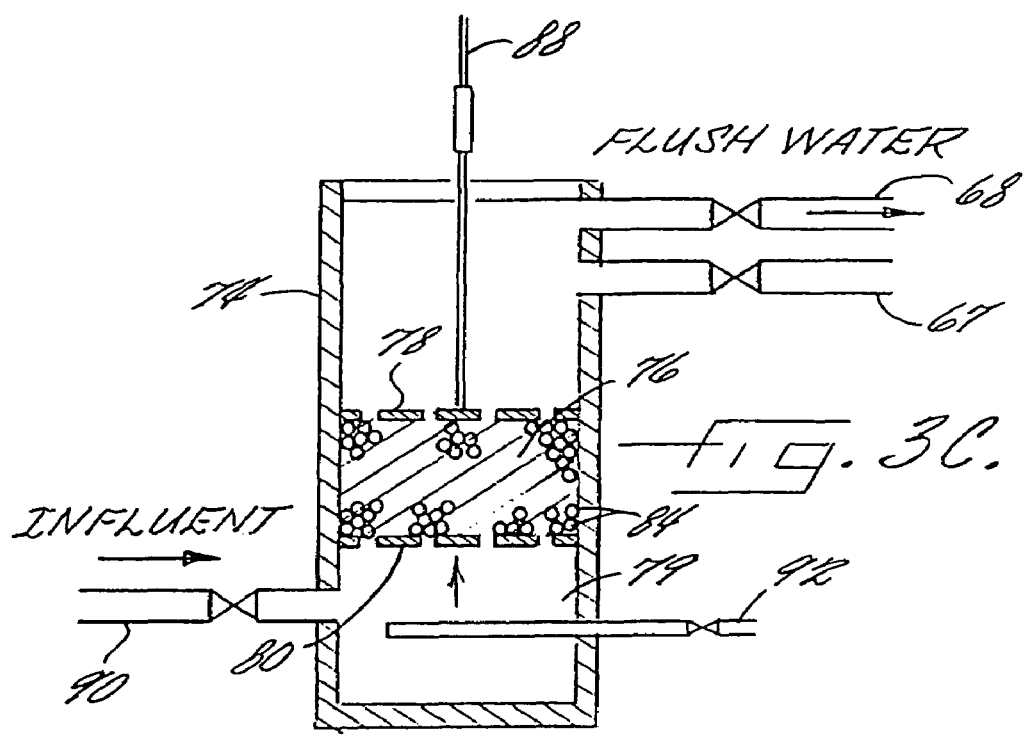

The operation of the filter in various modes is represented in FIGS. 3A through 3C in a longitudinal schematic cross section through the filter housing 74. In the filtration mode, FIG. 3A, the filter bed 76 is compressed by the top movable plate 78. Influent wastewater enters a distribution plenum 79 at the bottom most portion of the filter housing through a conduit 64. The wastewater, distributed evenly over the filter bed by the plenum, travels upwardly through the housing and enters the filter bed 76 through the apertures in the lower plate 80. The effluent filtered wastewater exits the filter bed through the apertures in the upper plate and is conveyed out of the filter housing through conduit 67. Suspended solids are trapped by the media.

It should be recognized that channeling of wastewater around the media in the region of the wall of the housing, if it occurs, can be alleviated by providing a flow distribution device adjacent the apparatus wall to direct the flow of wastewater away from the wall and into the filter bed. For example, a short baffle can be attached to the wall of the housing at regular intervals to extend into the filter bed by about two inches and at an angle of about 45 degrees upward to direct the flow of wastewater off the wall and into the filter bed.

When it is time to clean the filter media, the effluent conduit 67 is closed and conduit 68 is opened (FIG. 3B) to recycle the wastewater effluent from the filtration system to the activated sludge reactor 56 or other primary treatment location. The upper movable plate 78 is moved vertically upward to mechanically expand the filter bed to an uncompressed condition. Air or other gas is injected below the filter bed through conduits 92 and 94 (FIG. 2) to aid in expanding the bed and mechanically shearing the trapped solids from the filter media. Typically, air is injected on first one side and then the other side of the filter bed to increase the mechanical effect by alternating air injection between conduits 92 and 94.

After the filter media is sufficiently cleaned, the filter bed is flushed for a suitable period of time to remove residual solids prior to resuming filtration (FIG. 3C). The filter bed is compressed as in the filtration mode and the air supply is turned off. However, in the flush mode, the flush water is provided through conduit 68 to the activated sludge reactor for additional treatment rather than being taken off through effluent conduit 67.

The major parameters that impact filtration performance are the filtration rate, the depth of the media, the collector size, the porosity, and the influent quality. Typically, suspended solids in the influent and effluent wastewater can be correlated to turbidity, as is known to the skilled artisan. Turbidity monitoring equipment can be used in a conventional manner, as is believed to be understood by the skilled artisan, to determine the influent turbidity and to compare the influent turbidity to the effluent turbidity so as to monitor the performance of the filter.

Porosity and collector size of the filter media, in particular, impact effluent water quality and the development of headloss across the filter medium. Porosity is typically considered to be the ratio, expressed as a percentage, of the void spaces, or interstices, of the filter media to the total volume of the filter media. The collector size is typically considered to be the average diameter of the grains in the filter bed in a typical filter that includes a granular filtration medium. The collector size is normally defined as the average spacing between the pores in the filter bed.

The fluid to be filtered flows around the filtering medium in conventional sand or anthracite filters that are used in connection with tertiary wastewater treatment. Filter media has been found useful in the practice of the invention in which the fluid flows through the medium, rather than around the medium, unlike conventional filtration media. Filter media useful in the practice of the invention is also compressible, unlike conventional sand or anthracite media.

The collector size and the porosity, or void ratio, of the medium can be modified in accordance with the characteristics of the influent wastewater because the filter medium is compressible. Bed porosity and the collector size of the media is adjusted by adjusting the position of the upper movable plate.

The porosity and collector size of the filter medium can be altered during filtration to overcome the effect on effluent quality of variations in daily influent water quality and to increase the useful life of the filtration medium between washing steps. The filter bed can be mechanically expanded somewhat during filtration as headloss develops without a loss of filtration efficiency. Headloss through the medium can be monitored using pressure sensing equipment as is known in the art. Backwashing of the filter can be particularly efficient because the size of the filter bed and its porosity can be increased mechanically.

The filtration medium has low density, which typically is just slightly above the density of water. The porosity of the filter medium is estimated to be about 88 to 90 percent and the porosity of the uncompacted filter bed (FIG. 3B) is about 92 to 94 percent.

Figure 4:
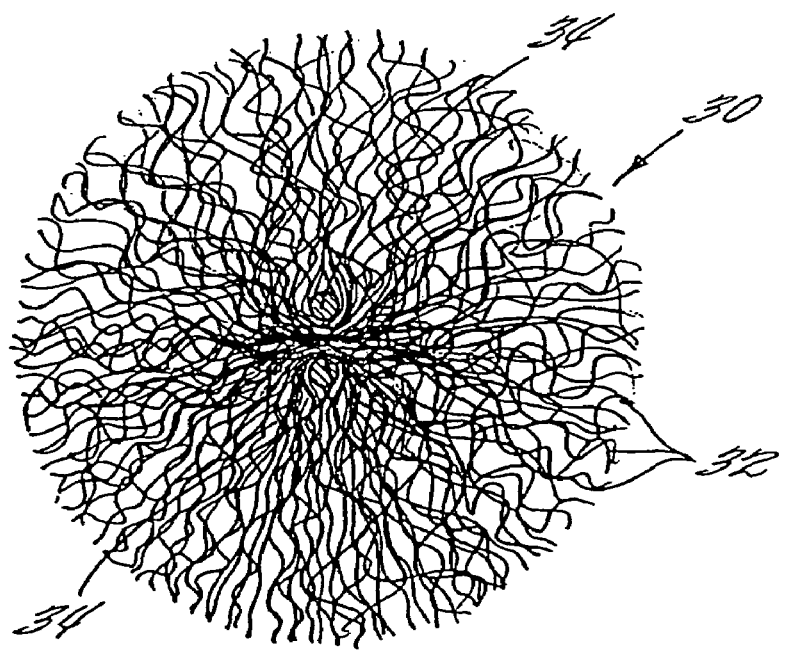
FIG. 4 is a representation of prior art filtration media for use in a filtration apparatus in accordance with the invention as described herein.
Figures 5A, 5B:
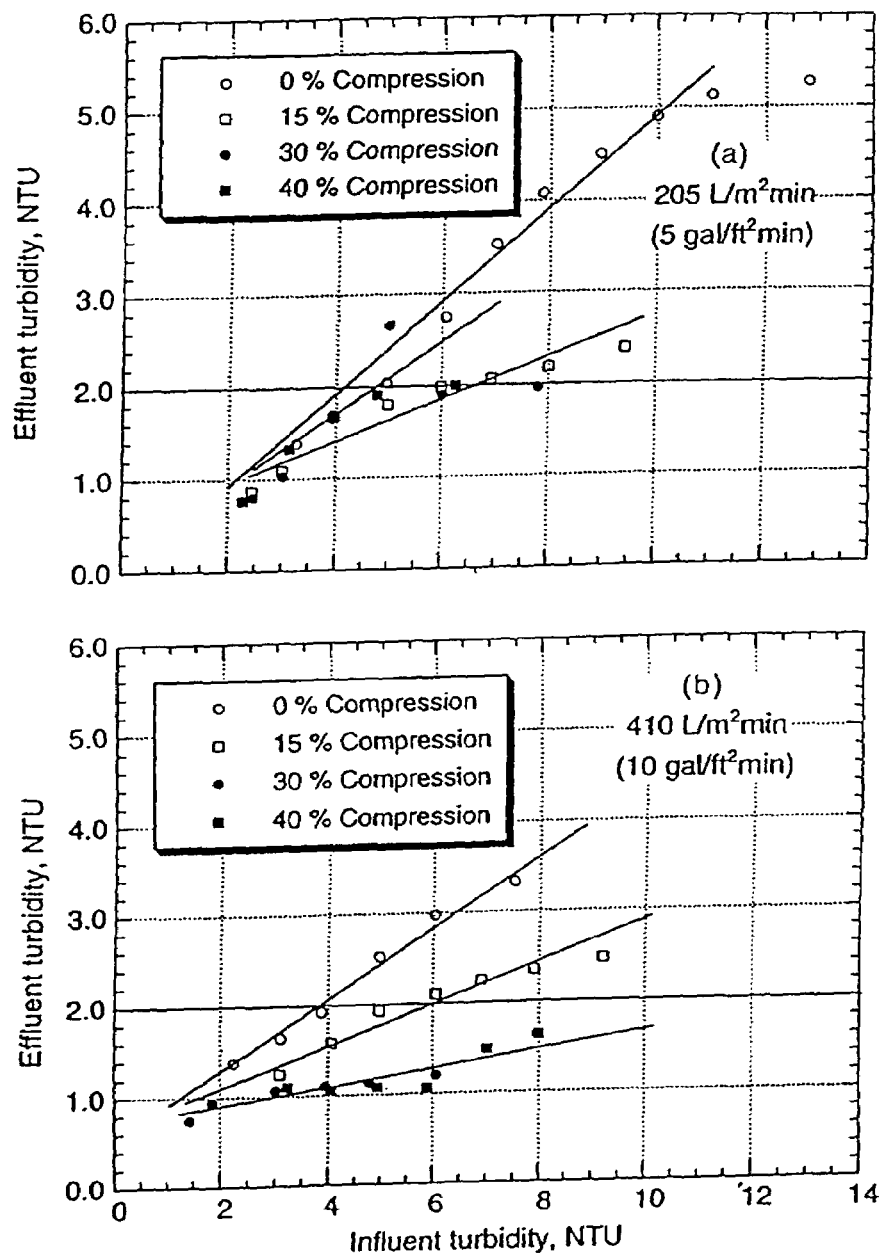
FIGS. 5A through 5D are plots of effluent turbidity against influent turbidity for an apparatus of the invention operated at four different flow rates and four different degrees of compression of the filter bed.
Figure 5C:
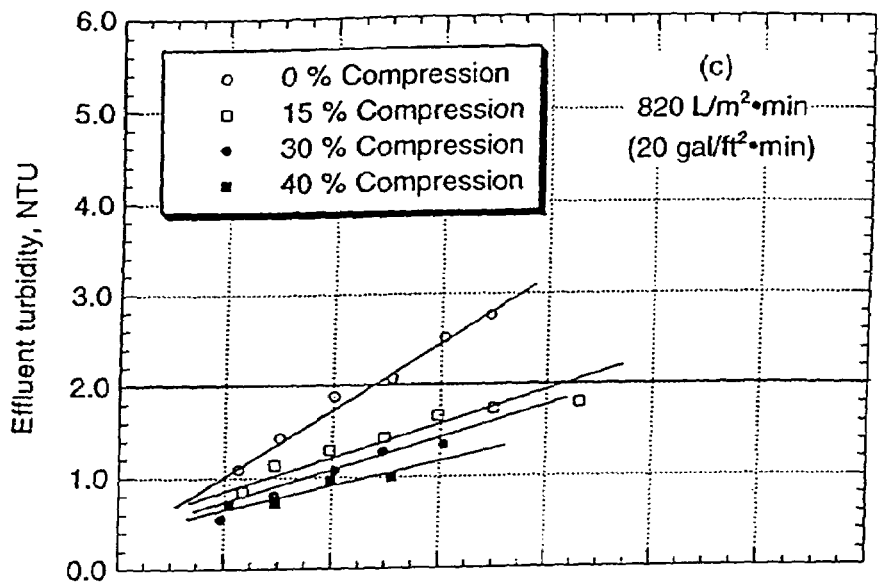
Figure 5D:
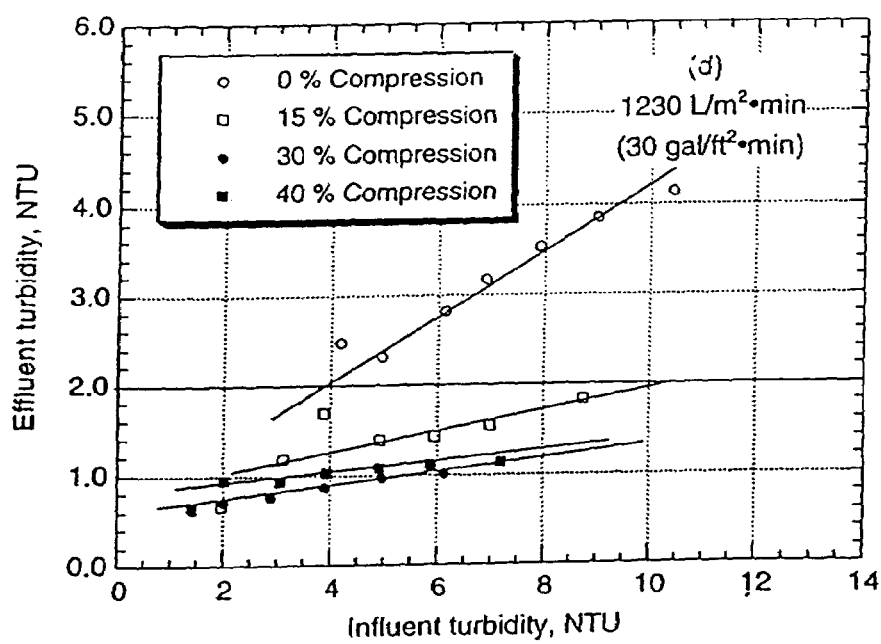

An example of filtration media useful in the practice of the invention described herein is described in Masuda et al. U.S. Pat. No. 5,248,415. This media is represented in FIG. 4 herein, generally at 30. The fibrous lumps have many bundled crimpy fibers 32 formed by providing synthetic fibers of 20 to 200 denier with 2 to 10 crimps per inch. The bundled crimpy fibers are wrung and bundled at the core portion thereof by a binding wire 34. The bundled crimpy fibers are rounded to provide the fibrous lump in the form of a substantial sphere having a diameter of 10 to 50 mm. A fiber having a higher specific gravity than water, for example, a polyvinylidene chloride fiber, is said to be optimal for the synthetic fiber to constitute the crimpy fiber. The fibers can also be made from polyvinylchloride, polyethylene fiber, or other synthetic fibers.

A filter as described above was evaluated to determine a range of useful operating parameters by adjusting the degree of compression of the filter bed at various flow rates and considering the influent and effluent turbidities, the removal efficiency for removal of suspended solids from the wastewater by the filter, and the development of headloss across the filter bed. The test unit had the following characteristics as shown in Table 1.

TABLE 1

| ITEM | UNIT | VALUE |
| --- | --- | --- |
| Filter Characteristics Overall outside | | |
| Length | m (ft) | 0.85 (2.75) |
| Width | m (ft) | 0.74 (2.4) |
| Height | m (ft) | 3 (9.85) |
| Filtration area | | |
| Length | m (ft) | 0.7 (2.3) |
| Width | m (ft) | 0.7 (2.3) |
| Area | m$^2$ (ft$^2$) | 0.49 (5.25) |
| Piping | | |
| Inlet | mm (in) | 100 (4) |
| Filtered water outlet | mm (in) | 150 (6) |
| Backwash water outlet | mm (in) | 150 (6) |
| Filter drain | mm (in) | 100 (4) |
| Filter Operation | | |
| Nominal flow rates | L/min (gal/min) | 100-795 (26-210) |
| Nominal filtration rates | L/m$^2$·min (gal/ft$^2$·min) | 205-1230 (5-30) |
| Maximum terminal headloss | mm (in) | 2,540 (100) |
| Nominal backwash rate | L/m$^2$·min (gal/ft$^2$·min) | 410 (10) |

Effluent turbidity was plotted against influent turbidity in a series of 16 runs at four different filtration rates and four different filter bed compression levels. The filtration rates varied from 205 to 1230 L/m$^2$·min (5 to 30 gal/ft$^2$·min) and compression rates varied from 0 to 40 percent compression to evaluate influent and effluent turbidity, headloss across the filter medium, and fractional turbidity removal based on the influent and effluent turbidity. The uncompacted filter bed at 0 percent compression was approximately 30 inches (760 millimeters) deep. Filtration rates, compression levels, and medium depths for each run are summarized in Table 2 below.

TABLE 2

| Run no. | Filtration Rate L/m²·min | Filtration Rate gal/ft²·min | Compression ratio % | Medium depth mm | Medium depth nn | Estimated porosity % |
|---|---|---|---|---|---|---|
| 1 | 205 | 5 | 0 | 760 | 30 | 92 |
| 2 | 205 | 5 | 15 | 650 | 25.5 | 90.5 |
| 3 | 205 | 5 | 30 | 530 | 21 | 88.5 |
| 4 | 205 | 5 | 40 | 460 | 18 | 87 |
| 5 | 410 | 10 | 0 | 760 | 30 | 92 |
| 6 | 410 | 10 | 15 | 650 | 25.5 | 90.5 |
| 7 | 410 | 10 | 30 | 530 | 21 | 88.5 |
| 8 | 410 | 10 | 40 | 460 | 18 | 87 |
| 9 | 820 | 20 | 0 | 760 | 30 | 92 |
| 10 | 820 | 20 | 15 | 650 | 25.5 | 90.5 |
| 11 | 820 | 20 | 30 | 530 | 21 | 88.5 |
| 12 | 820 | 20 | 40 | 460 | 18 | 87 |
| 13 | 1230 | 30 | 0 | 760 | 30 | 92 |
| 14 | 1230 | 30 | 15 | 650 | 25.5 | 90.5 |
| 15 | 1230 | 30 | 30 | 530 | 21 | 88.5 |
| 16 | 1230 | 30 | 40 | 460 | 18 | 87 |

The backwash flow rate for the filtration unit was set in a conventional manner using a bypass loop located in the conduit supplying influent to the filtration unit. The bypass loop was equipped with a ball valve that was used to regulate the backwash flow rate. The influent conduit was equipped with a gate valve followed by an automatic ball valve opposite the bypass loop. The gate valve was used to regulate the filtration rate and the automatic ball valve was used to divert flow to the bypass loop where the backwash flow rate could be adjusted as soon as the backwash cycle started. The backwash flow rate was set to approximately 410 L/m₂·min. (10 gal/ft²·min) for all of the 16 runs.

A terminal headloss value of 2540 mm (100 inches) of water was selected for all of the runs. Turbidity sampling was accomplished at about 400 m/min for all runs. Suspended solids were correlated to turbidity values according to standard, art recognized methods.

The results of the 16 runs are plotted in FIGS. 8A through 23C. Figures A are plots of effluent and influent turbidity against time. Figures B are plots of suspended solids (turbidity) removal efficiency against time. Fractional turbidity removal versus time data was obtained by using the influent and effluent turbidities obtained in Figures A and with respect to the following relationship: removal efficiency=1− (effluent turbidity/influent turbidity). Initial headloss and the development of headloss across the filter medium was monitored continuously. The results are plotted in Figures C for FIGS. 8 through 23.

Figure 9A:
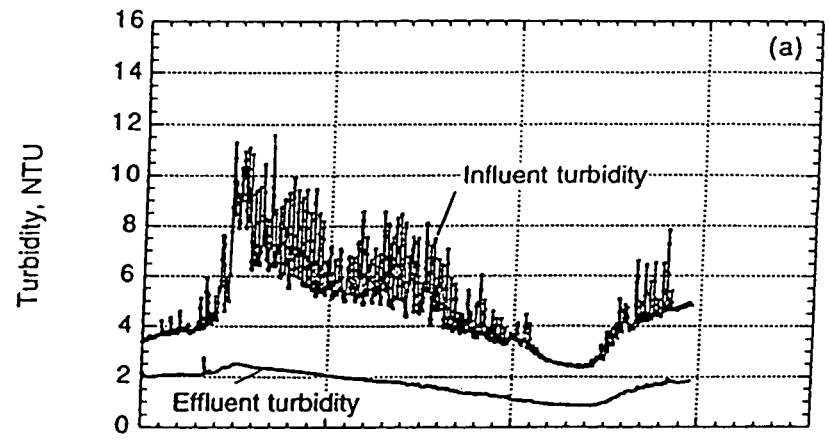
Figure 9B:
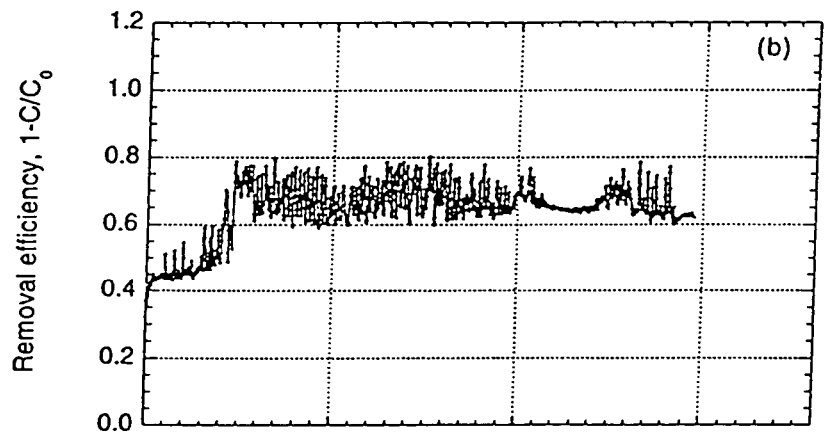
Figure 9C:
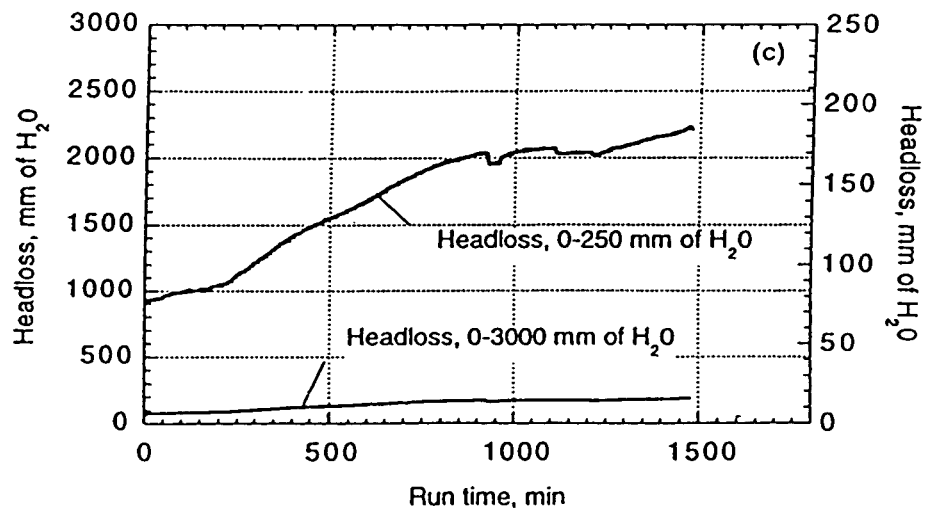
Figure 10A:
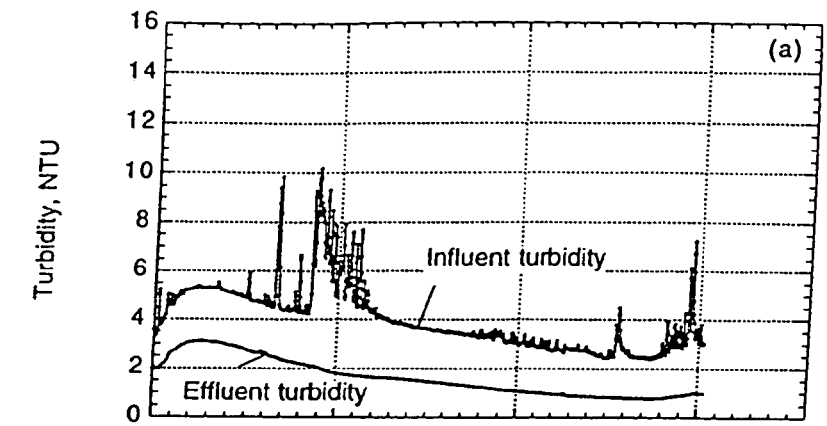
Figure 10B:
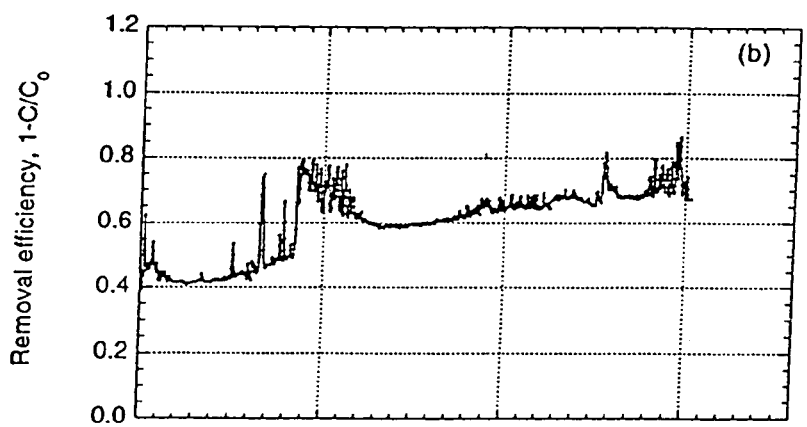
Figure 10C:
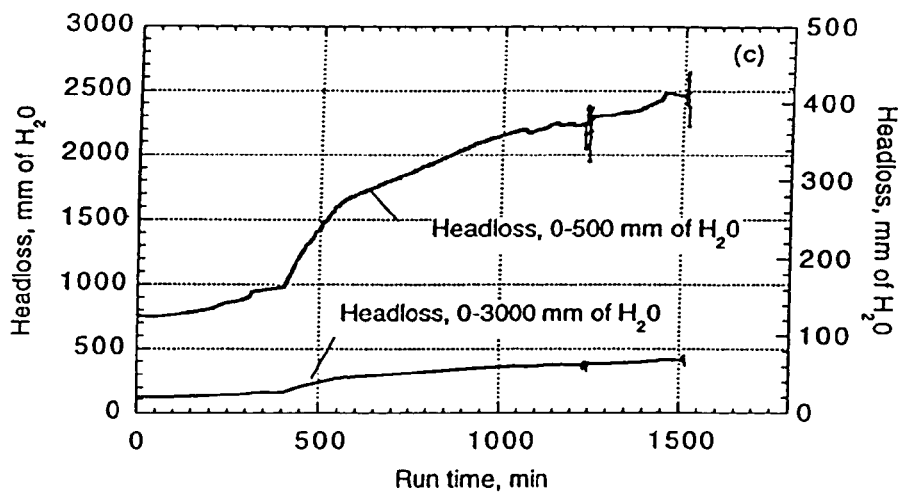
Figure 11A:
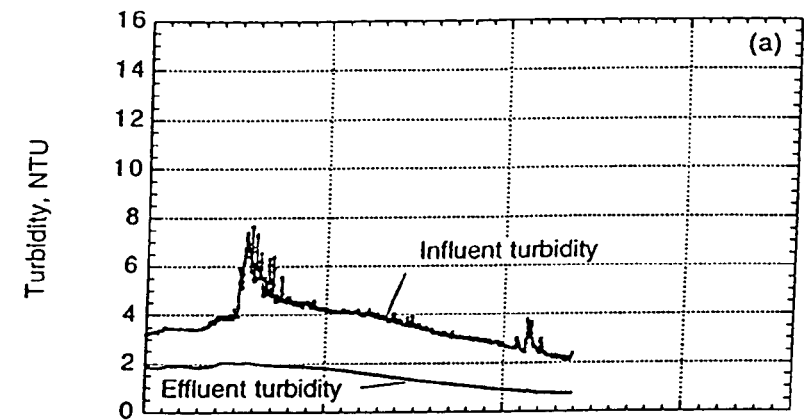
Figure 11B:
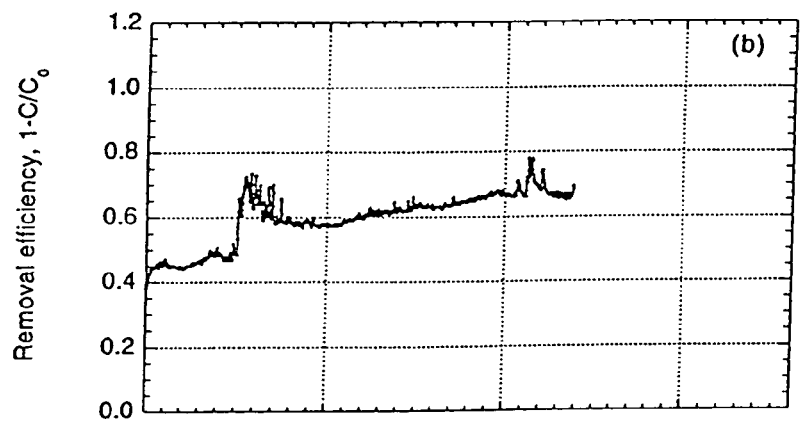
Figure 11C:
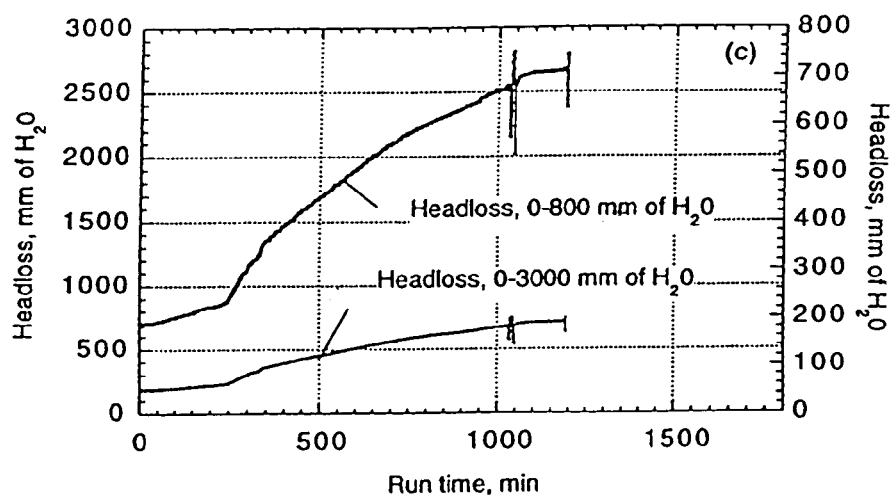
Figure 12A:
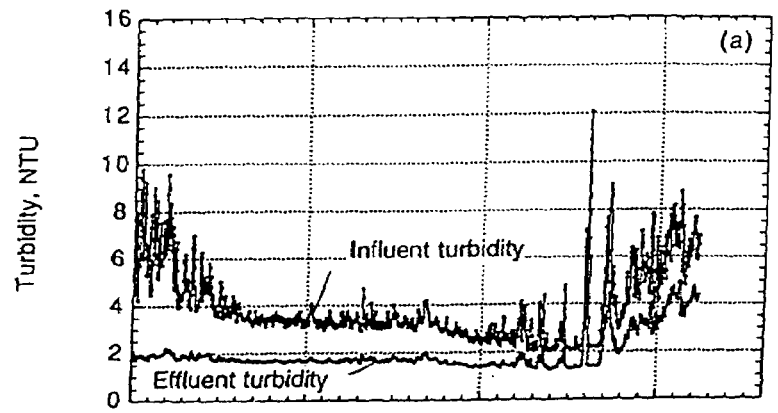
Figure 12B:
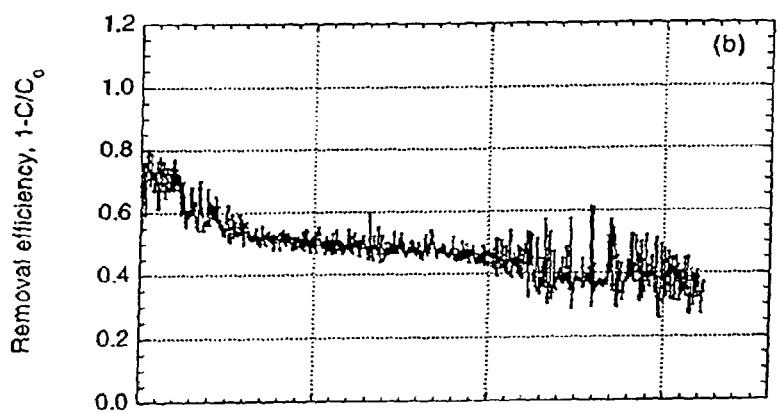
Figure 12C:
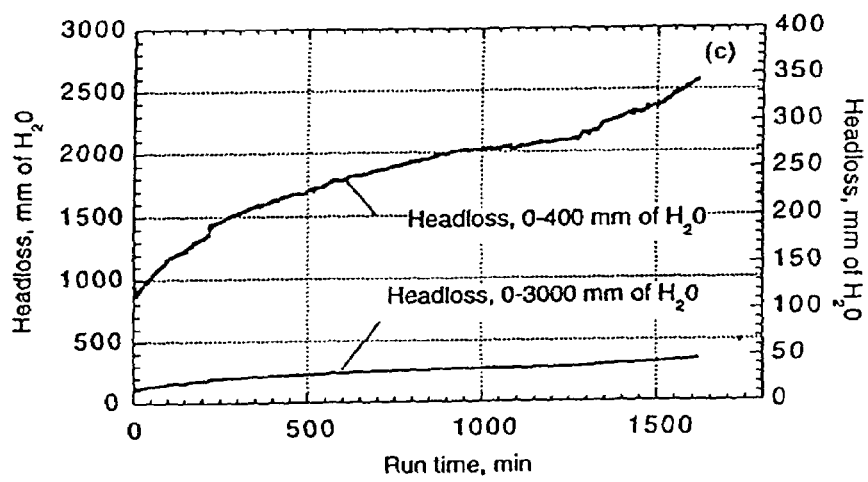
Figures 13A, 13B, 13C:
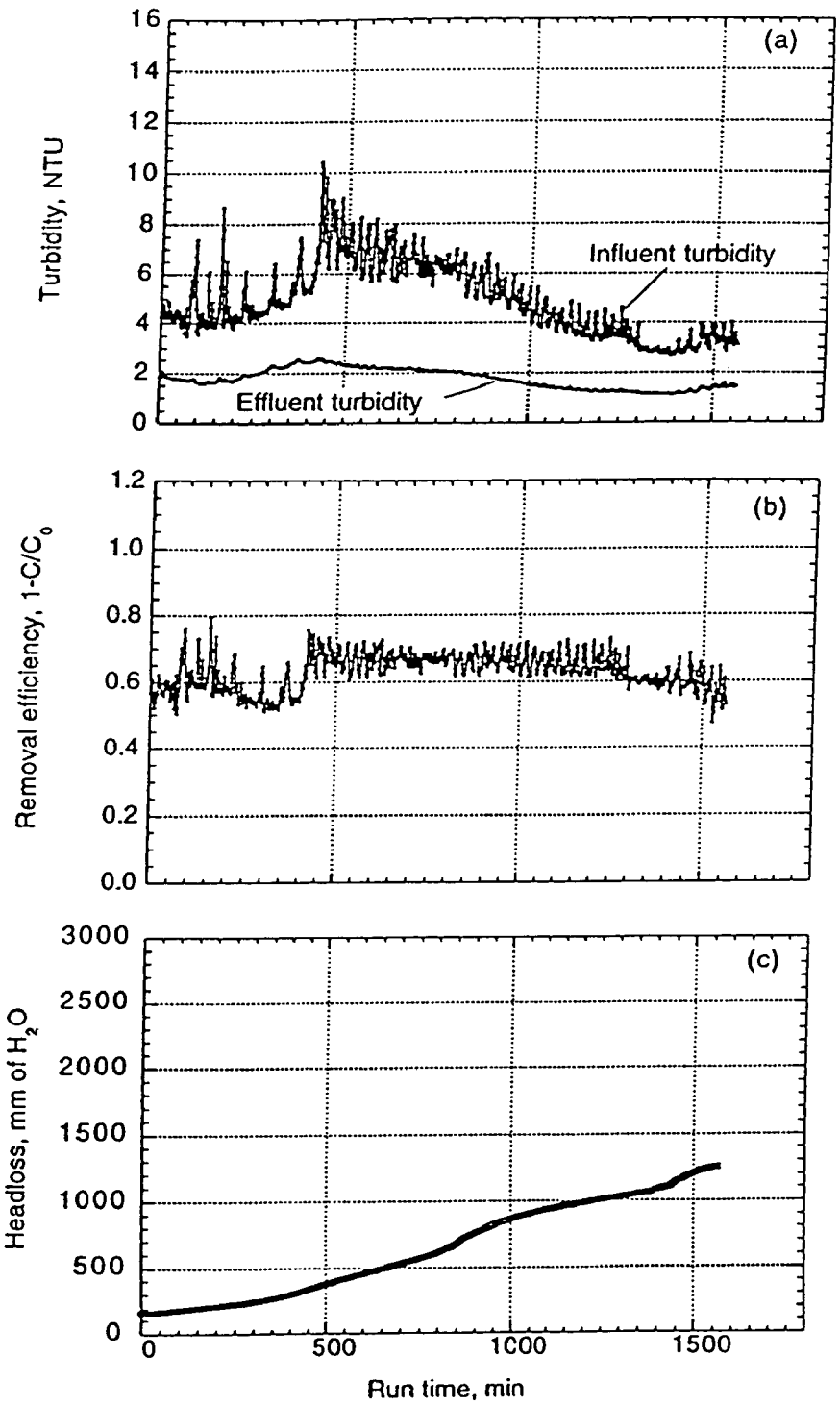
Figures 14A, 14B, 14C:
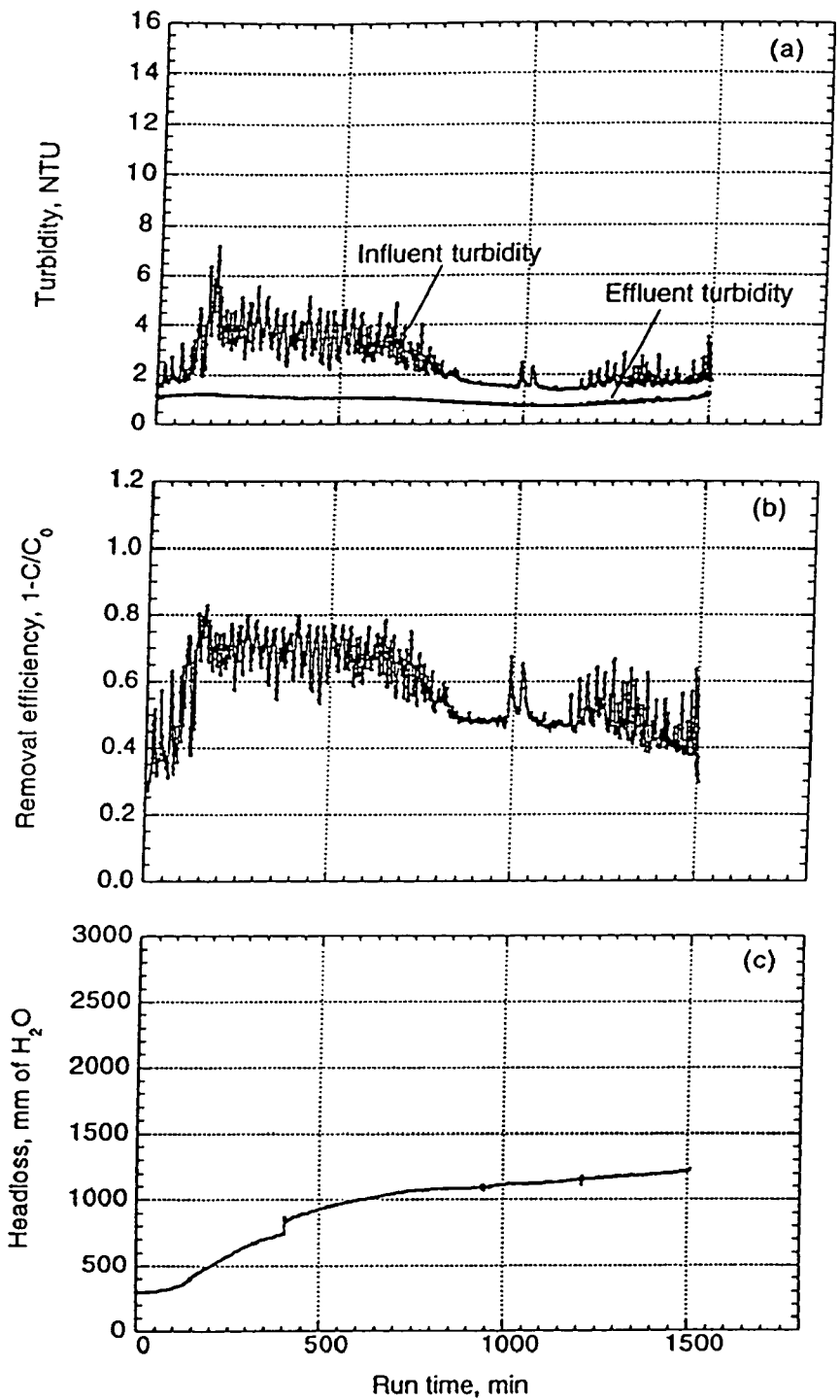
Figure 15A:
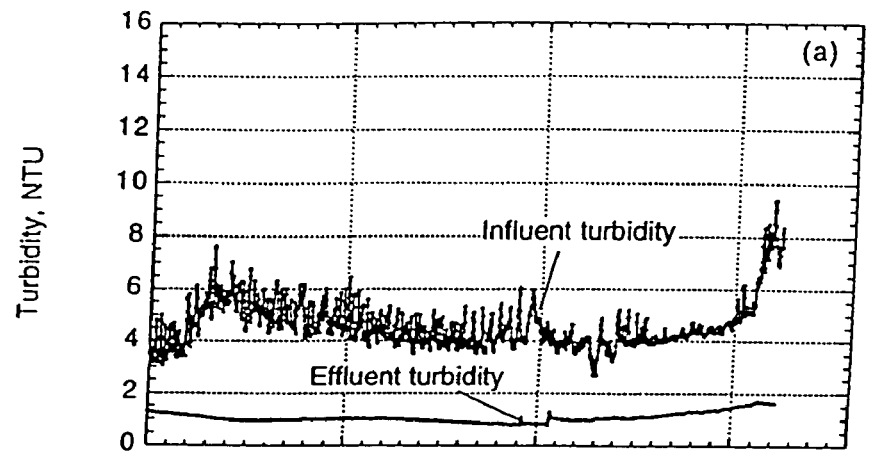
Figure 15B:
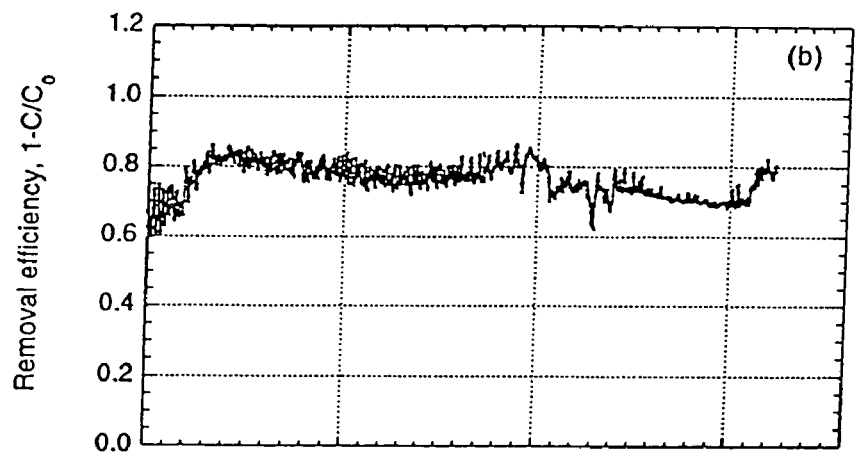
Figure 15C:
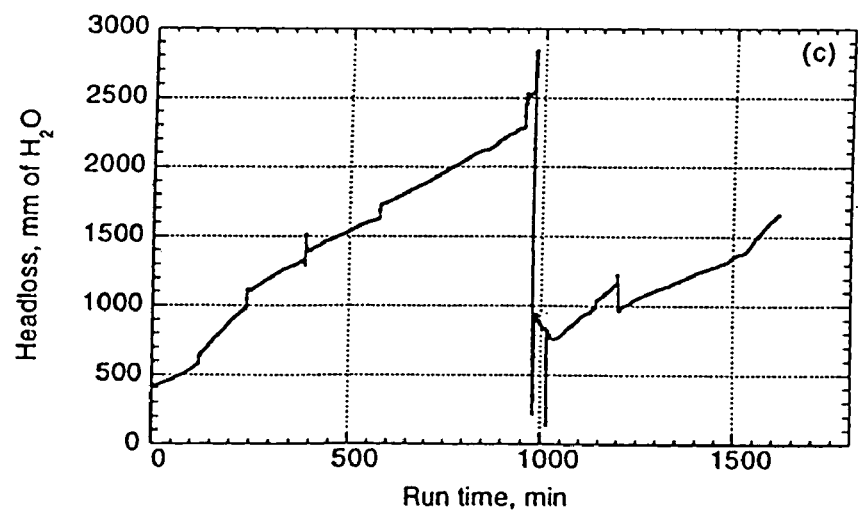
Figures 16A, 16B, 16C:
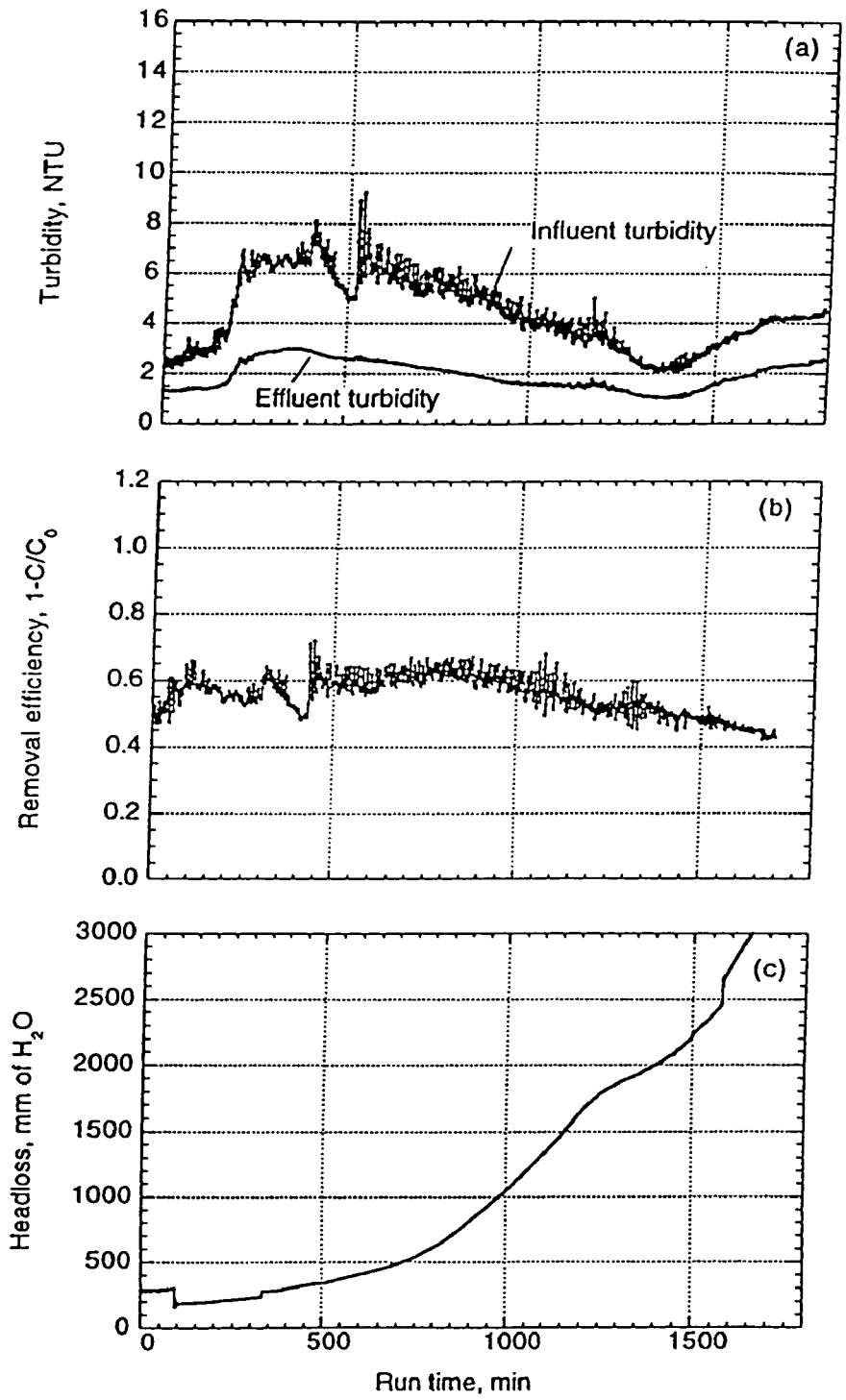
Figure 17A:
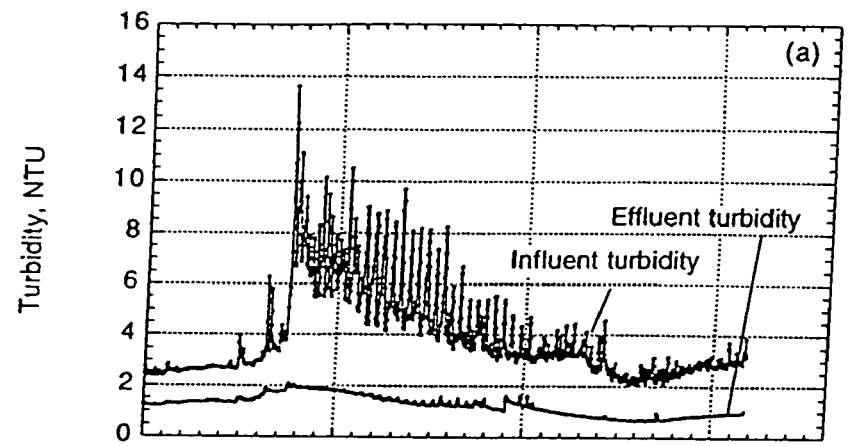
Figure 17B:
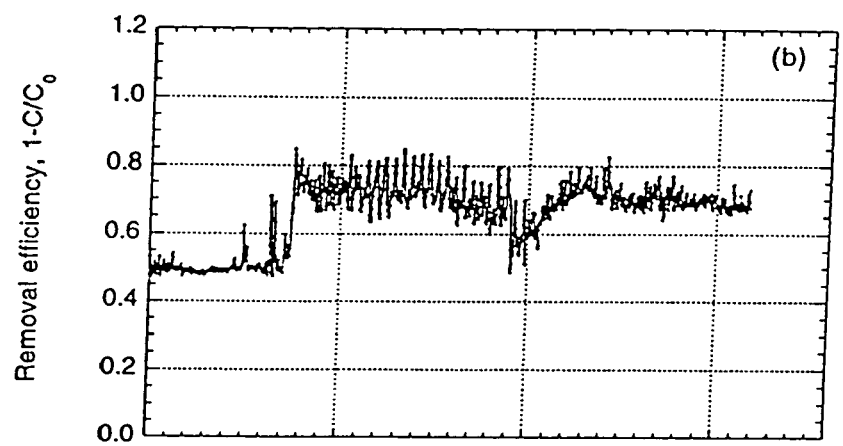
Figure 17C:
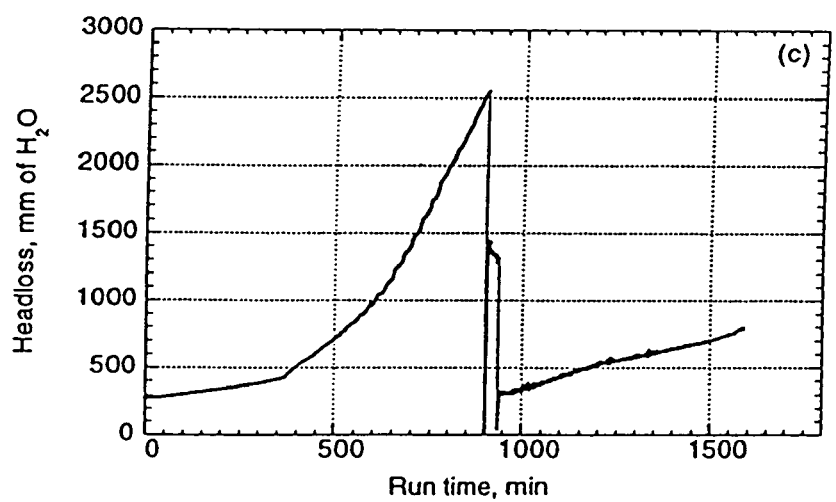
Figure 18A:
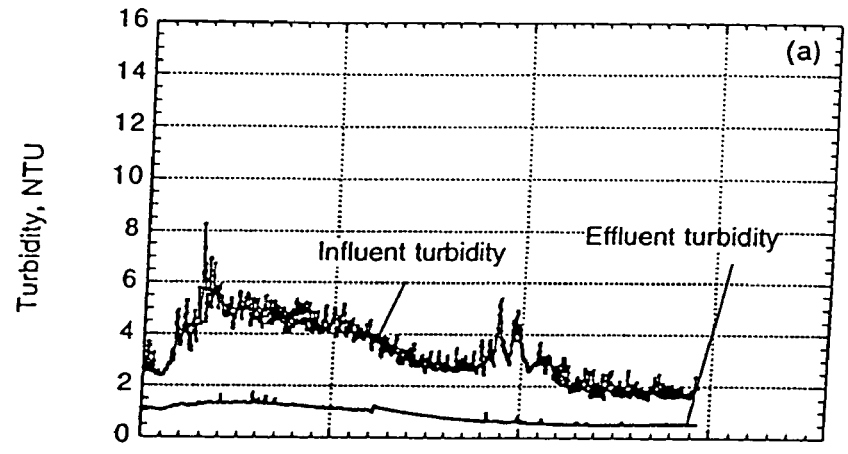
Figure 18B:
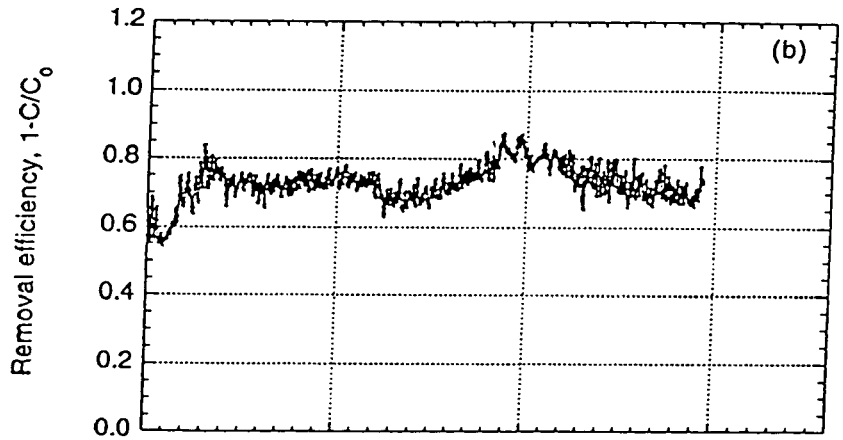
Figure 18C:
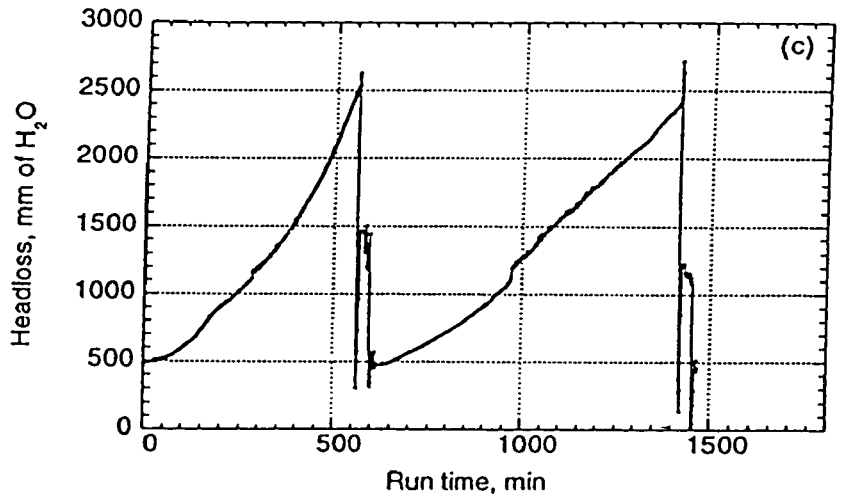
Figure 19A:
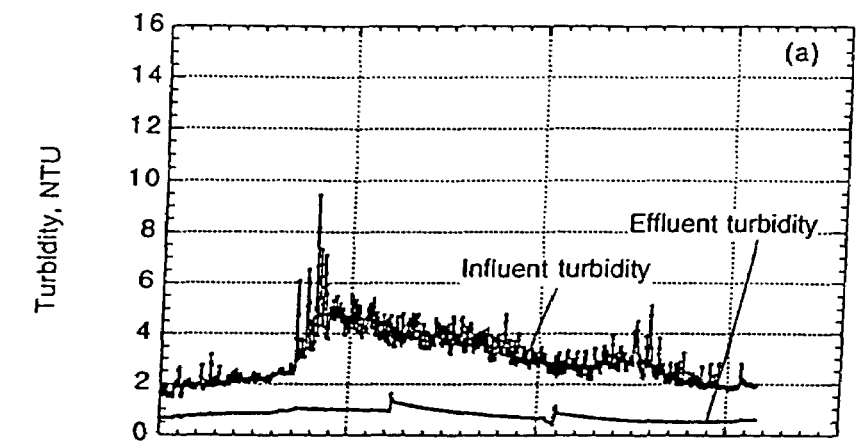
Figure 19B:
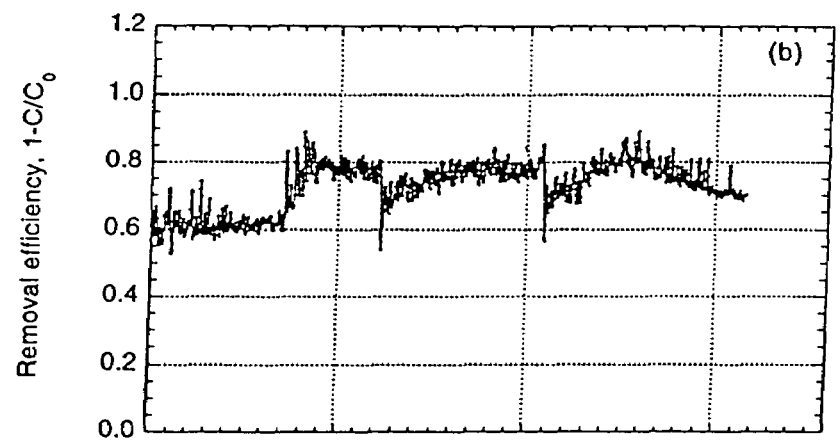
Figure 19C:
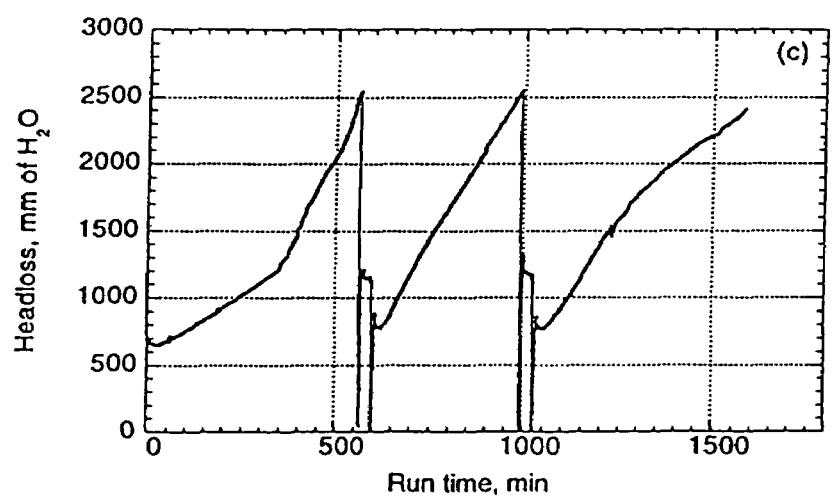
Figures 20A, 20B, 20C:
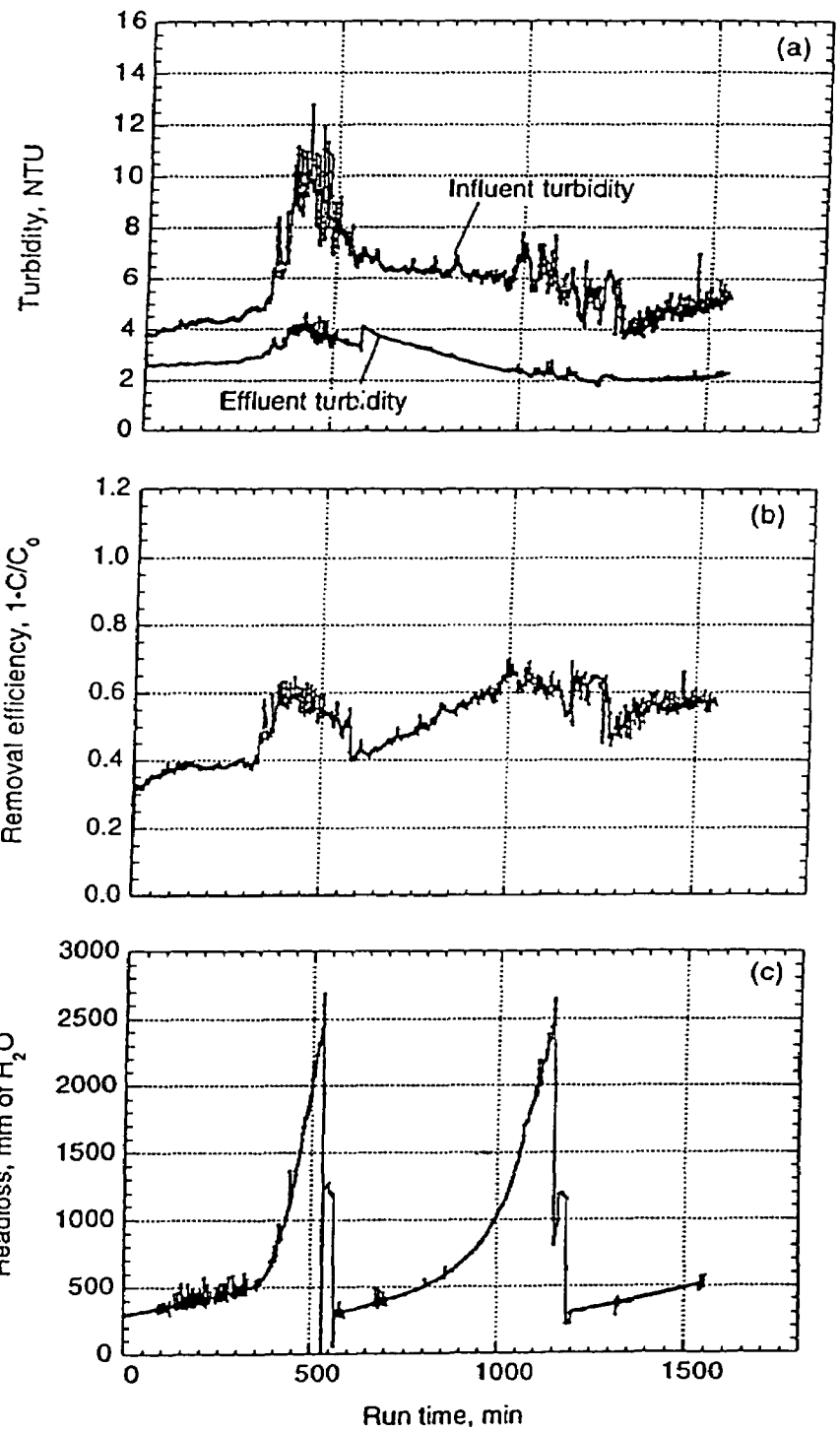
Figure 21A:
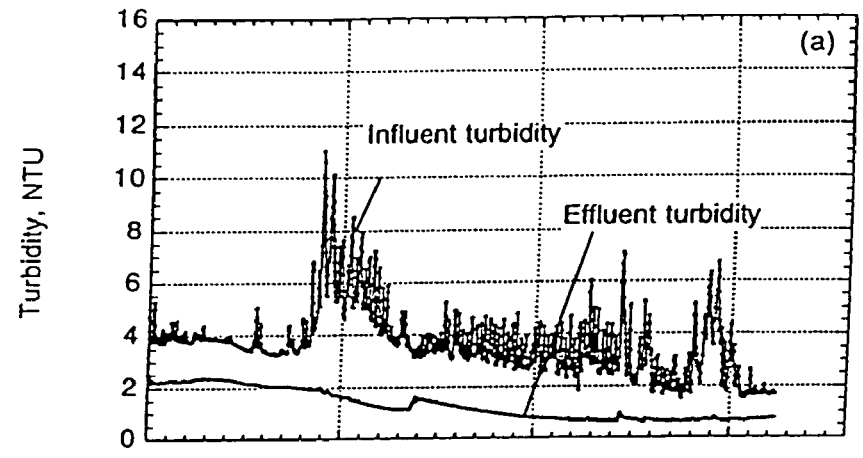
Figure 21B:
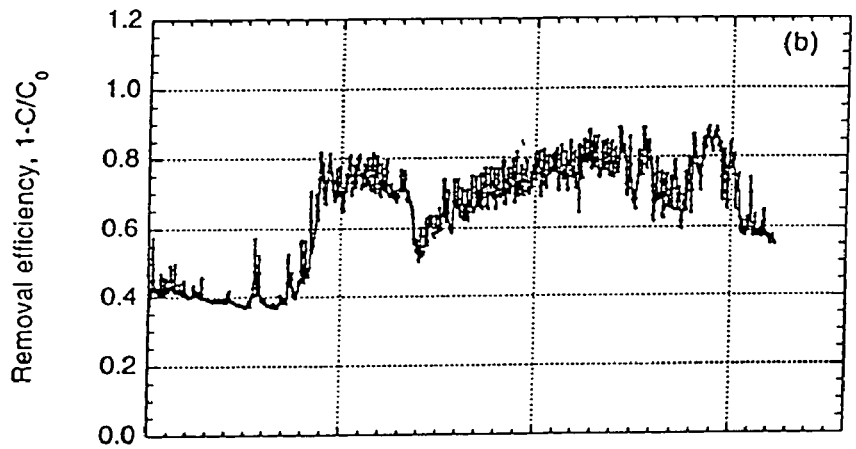
Figure 21C:
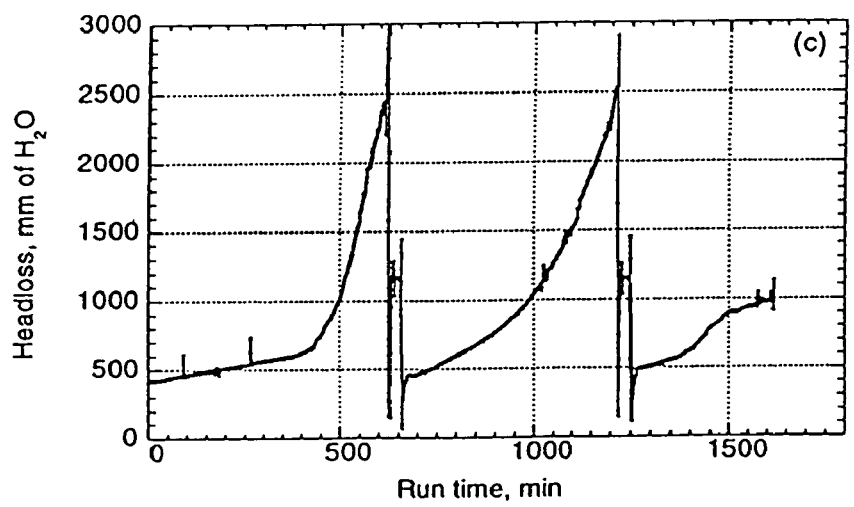
Figures 22A, 22B, 22C:
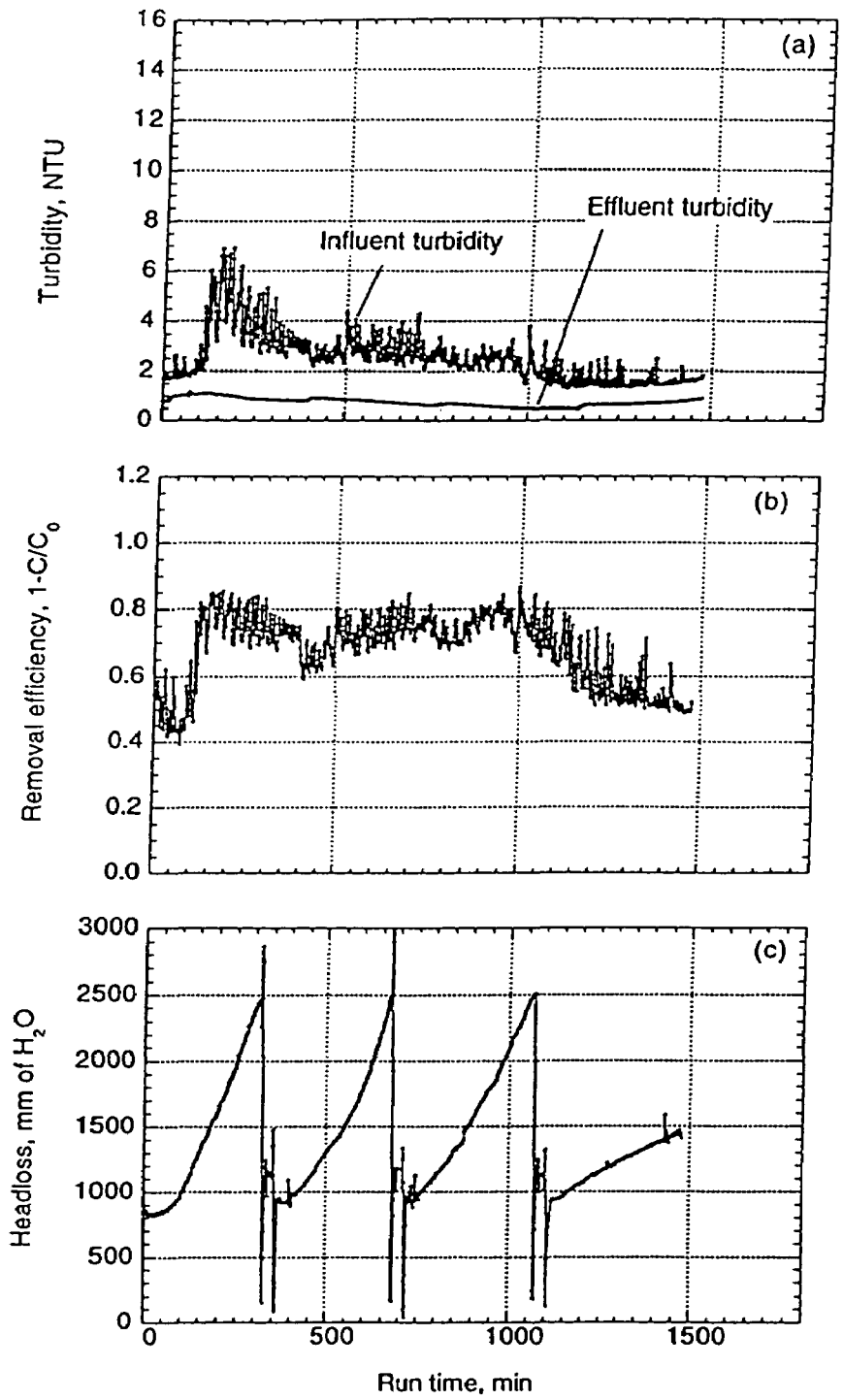
Figure 23A:
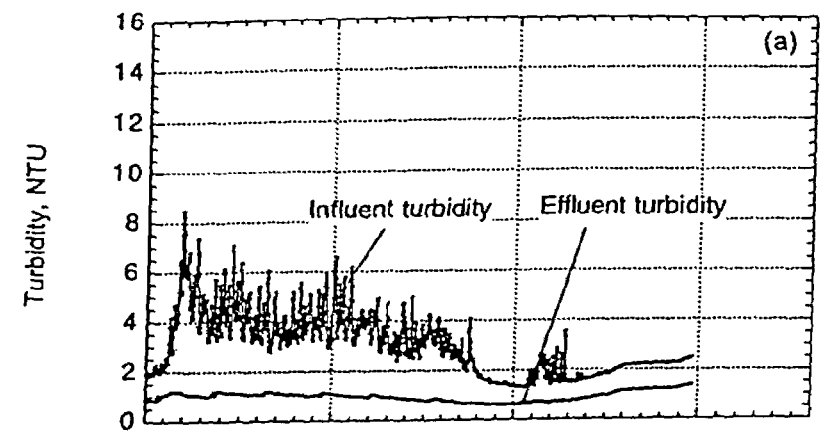
Figure 23B:
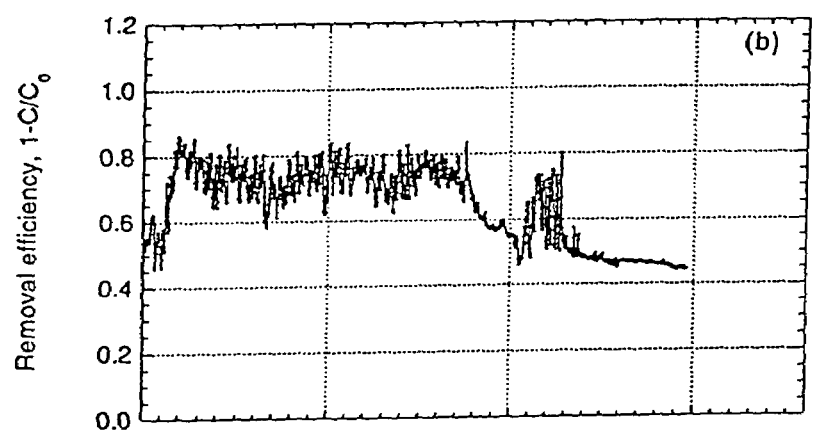
Figure 23C:
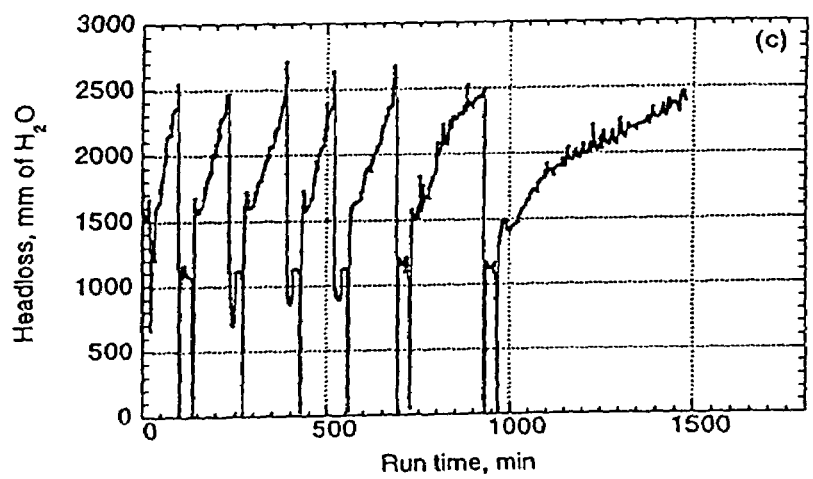
Figure 74:
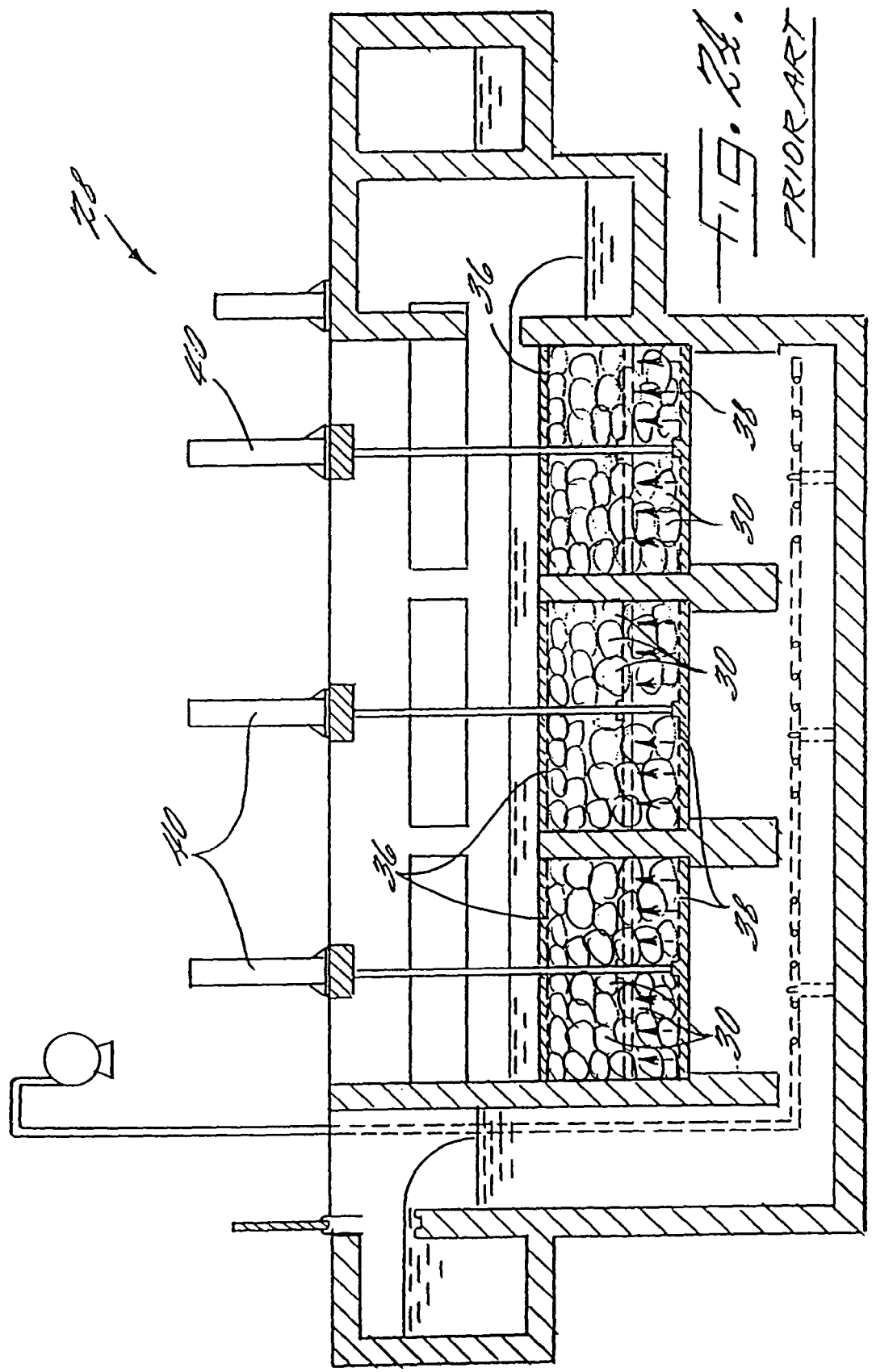

FIGS. 8 through 11 are for filtration of wastewater at a rate of 205 L/m₂·min (5 gal/ft²·min). FIG. 8 shows an initial bed depth of 30 inches at 0 percent compression. FIG. 9 is at 15 percent compression; FIG. 10 is at 30 percent compression; and FIG. 11 is at 40 percent compression. FIGS. 12 through 15 are at a filtration rate of 410 L/m²·min (10 gal/ft²·min) at four different bed compressions of 0 percent, 15 percent, 30 percent, and 40 percent. FIGS. 16 through 19 are taken at a filtration rate of 820 L/m²·min (20 gal/ft²·min) at four different bed compressions of 0 percent, 15 percent, 30 percent, and 40 percent. FIGS. 20 through 23 are taken at 1230 L/m²·min (30 gal/ft²·min) at four different bed compressions of 0 percent, 15 percent, 30 percent, and 40 percent.

It is shown in these Figures that as the degree of bed compression is increased, the overall turbidity removal increases. Indeed, at a low flow rate of 205 L/m²·min (5 gal/ft²·min) filter ripening was observed and the flow occurred primarily around the filter medium rather than through the medium as is the case at higher filtration rates. The removal efficiency is reduced when the flow is around the filter medium because the suspended solids and the liquid can move through the relatively larger intersticies between the individual filter lumps. However, as material begins to accumulate within the filter bed and to participate in filtration, the removal efficiency increases. Ripening is not as significant at higher filtration rates because the removal of suspended solids occurs primarily through the medium and not around the medium.

When the flow is through the medium, the collector size, which can be defined as the size of the grains in a granular filter medium, can be defined with the filter medium as used in the invention as the average pore spacing within the structure of the individual filter lump. Trapped particles tend to decrease the collector size of the medium and results in an increase in the removal of additional particles by interception and straining. When the flow is around the filter medium, the collector size is defined as the nominal diameter of one fibrous lump. The difference between the initial collector size and the collector size at any time during the filtration cycle is much larger when the flow occurs around the medium, and therefore filter ripening becomes more important at low filtration rates.

The porosity, depth of the filter bed, and collector size can all be altered, even during the filtration cycle, because the filter medium is compressible. The maximum removal efficiency that can be achieved is somewhat dependent on the characteristics of the material being filtered, which is primarily colloidal. Removal efficiency typically increases as the filter bed is compressed until some maximum level is reached. For example, as shown in FIGS. 8B through 11B, the average removal efficiency of the filter increased from about 55 percent at 0 percent bed compression to about 61 percent at 30 percent bed compression when the flow rate was at 205 L/m²·min (5 gal/ft²·min). At 410 L/m²·min (10 gal/ft²·min), the removal efficiency of the filter increased from 48 percent at 0 percent bed compression to 65 percent at 30 percent bed compression.

The maximum removal efficiency in the practice of the invention occurs at different compression levels as the filtration rate is increased and the characteristics of the influent to the filter change. Maximum removal efficiency was observed to occur at 40 percent bed compression at a filtration rate of 410 L/m²·min (10 gal/ft²·min). However, at flow rates of 820 to 1230 L/m²·min (20 to 30 gal/ft²·min), maximum removal efficiency occurred at 30 percent bed compression.

It should be recognized that the filtration system of the invention can be usefully operated at flow rates above 1230 L/m²·min (30 gal/ft²·min) depending on the influent quality, the desired effluent quality, and the head loss across the filter. For example, if the effluent is to retain some nutrient quality for use as fertilizer, then the filter influent typically is taken from a primary clarifier. Depending on the influent quality and desired effluent quality, the filter should be operable at increased flow rates above 1230 L/m²·min (30 gal/ft²·min) so long as the increase in the rate of head loss across the filter provides economical operation. Flow rates of from about 1640 L/m²·min (40 gal/ft²·min) to 2050 L/m²·min (50 gal/ft²·min) should be useful in this regard.

As shown in FIGS. 8B through 23B, removal efficiency is not significantly impacted by the filtration rate. Instead, removal efficiency is impacted more by the compression of the filter medium.

It should be noted that the removal efficiency appears to be lower when the influent turbidity is in the range of from 1.5 to 3 NTU. At low influent turbidity, the particle size of the influent solids is shifted more towards the smaller colloidal size particles than the typical particle size distribution observed when the influent turbidity is higher than 3 NTU. The turbidity of the secondary effluent from a typical activated sludge wastewater treatment plant is in the range of from 3 to 8 NTU. Accordingly, in the case where the turbidity is in the range of from 1.5 to less than about 3 NTU, the performance of the filter cannot be evaluated solely based on the removal efficiency data.

An effluent turbidity versus influent turbidity analysis was performed to determine the various influent turbidity values that can be filtered with the filter of the invention without the use of chemicals and without exceeding an effluent turbidity unit of 2 NTU, which is the current requirement under Title 22 of the California Administrative Code. The results of the analysis are plotted in FIGS. 5A through 5D at four different filtration rates from 205 to 1230 L/m²·min (5 to 30 gal/ft²·min). As shown in FIGS. 5A through 5D, required effluent turbidity values can be achieved from increasing influent turbidity as the compression of the filter bed increases at all of the filtration rates evaluated.

As evaluated, it has been determined that the effluent turbidity typically is equal to or lower than 2 NTU for influent turbidity values of up to about 8 NTU when the flow rate is from about 410 to 1230 L/m²·min (10 to 30 gal/ft²·min). If the influent turbidity is from about 7 to 10 NTU, then chemical addition normally is required to produce an effluent with an average turbidity of 2 NTU or less.

Figure 7:
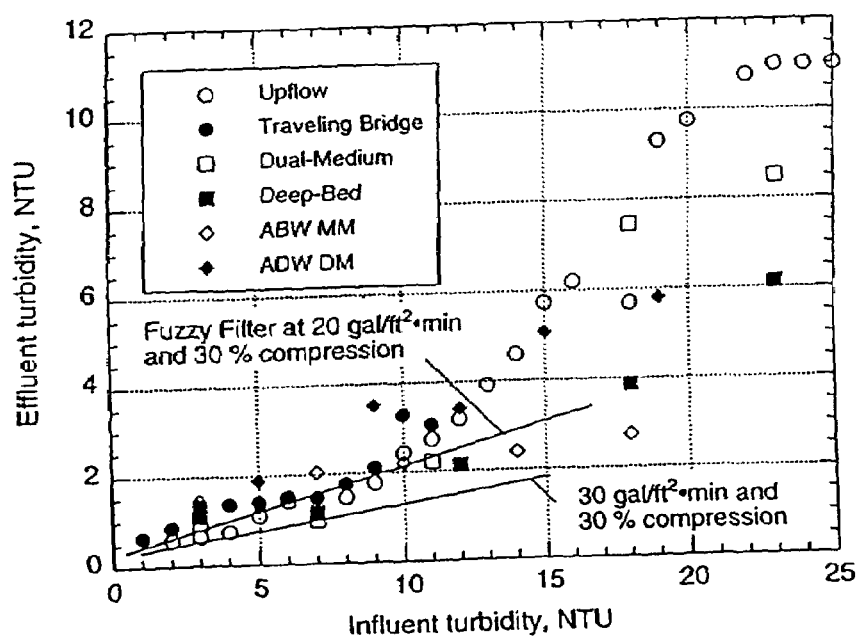
FIG. 7 is a plot of effluent turbidity against influent turbidity for an apparatus of the invention operated at 30% compression and at two different flow rates compared to several examples taken from the prior art operated at lower flow rates.
Figure 8A:
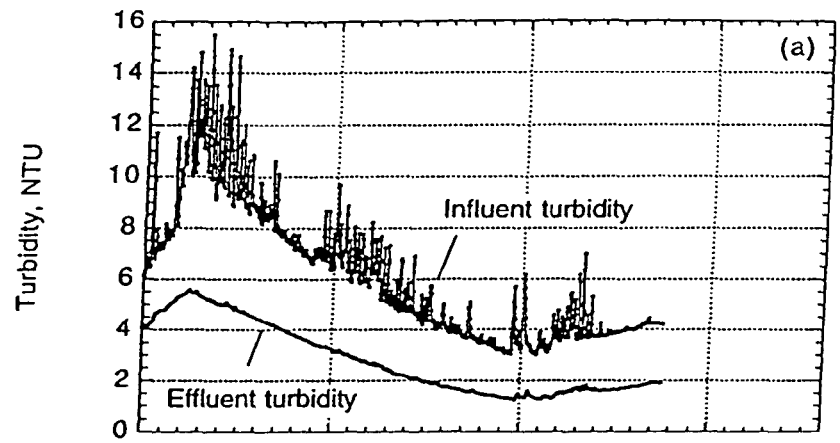
FIGS. 8A through 23C are plots of time against three different parameters for evaluating the performance of a filtration apparatus in accordance with the invention at four different influent flowrates and at four different percents compression of a filter bed at fixed initial depth for each flowrate: Figures A are plots of time against influent and effluent turbidity, Figures B are plots of time against efficiency of removal of suspended solids, and Figures C are plots of time against headloss across the filter media.
Figure 8B:
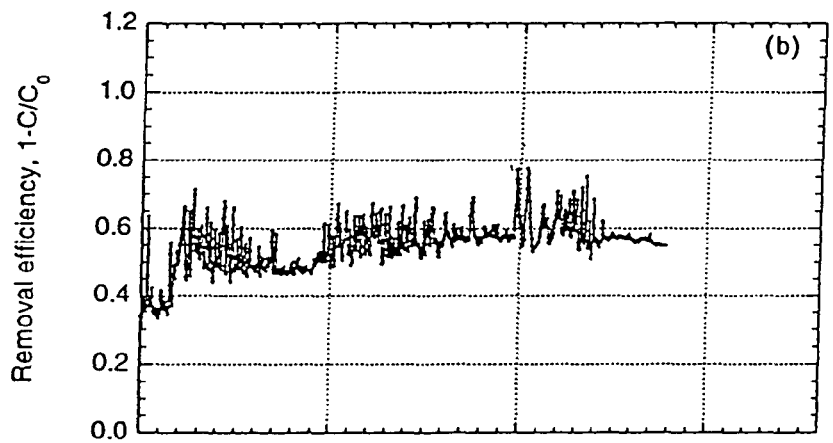
Figure 8C:
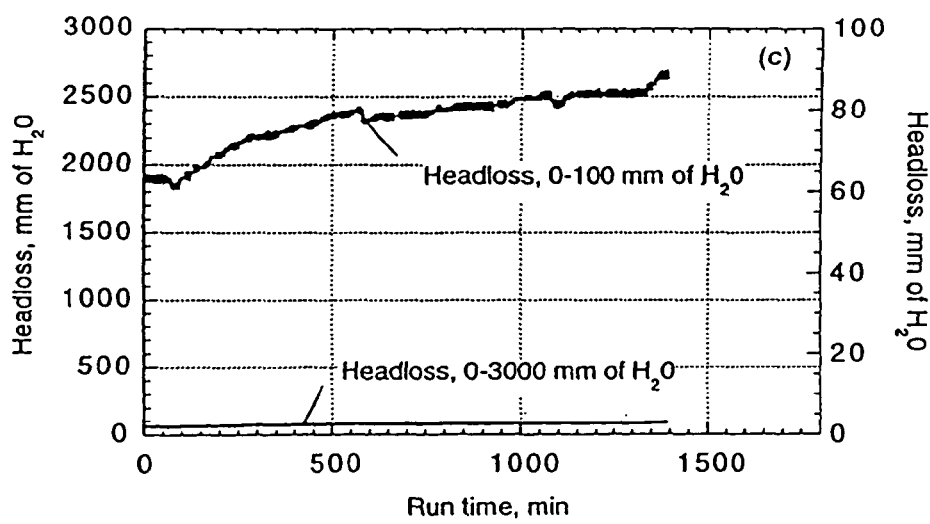

It should be noted that this performance in terms of the influent and effluent turbidity values is comparable to that for the operation of conventional filters, as reflected in FIG. 7. The principal types of conventional filtration technologies include 1) conventional mono-, dual-, and multi-medium downward flow filters, 2) deep-bed downward flow and/or upflow mono-medium filters, 3) post-bed mono-medium downward flow filters, 4) shallow-depth single and dual-medium downward flow traveling bridge filters, and 5) continuous backwash upflow unstratified mono-medium deep bed filters. Nevertheless, the filter as described herein achieves these performance levels at filtration rates that vary from 6 to 15 times as great as those for conventional filters. Thus, the overall efficiency of filtration achieved with the practice of the invention is many times greater than that with conventional filters.

Figure 6:
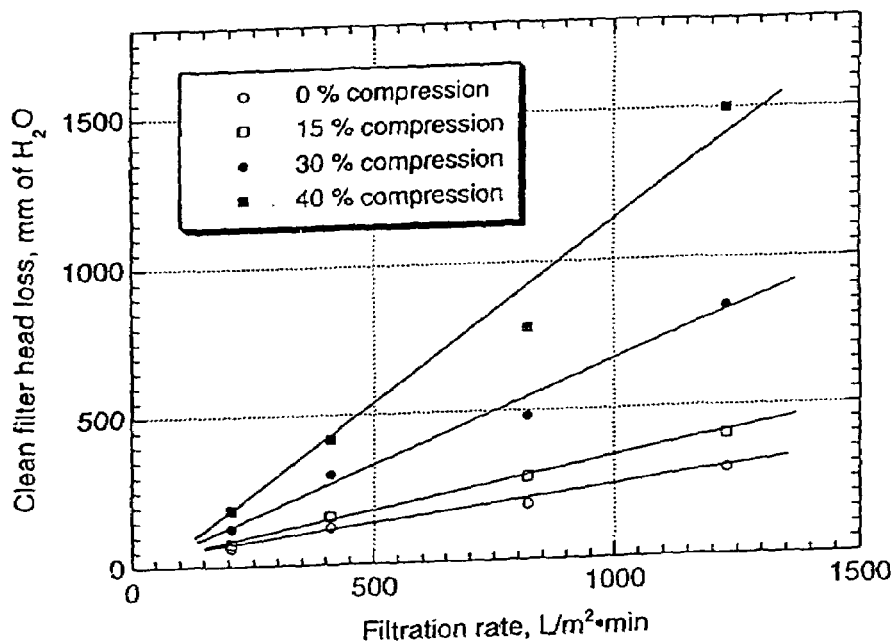
FIG. 6 is a plot of headloss against filtration flow rate for an apparatus of the invention, starting with a clean filter bed, operated at four different degrees of compression of the filter bed.

Clean filter headloss, the development of headloss during filtration, and the development of headloss with the accumulation of solids is effected by the filtration rate and the compression of the bed. Clean filter headloss is plotted against filtration rate for the 4 filtration rates that were evaluated at 4 different bed compressions in FIG. 6. As shown in FIG. 6, the initial headloss at a flowrate of 205 L/m²·min (5 gal/ft²·min) and at 0 percent bed compression is 63 mm (2.5 inches) of water. This initial value increases linearly to a value of 127 mm (5 inches) of water at a flowrate of 410 L/m²·min (10 gal/f²·min) at 0 percent compression. The linear increase in headloss tends to indicate that the flow regimen through the filter is laminar.

The impact of compression of the bed is clearly evident in the curves plotted in FIG. 6. Increase in headloss at any given filtration rate, however, is not a linear function of the degree of compression. Increasing the degree of bed compression increases both the removal efficiency and the headloss occurring across the filter medium. Thus, it is important to identify a compression level at which the desired effluent quality is achieved while keeping headloss occurring across the filter medium within reasonable levels.

The development of headloss with time for the different filtration rates and bed compression values is illustrated in FIGS. 8C through 23C. As shown in these figures, depending on the filtration rate, there is a gradual build up of headloss with time as suspended solids accumulate within the filter. At some critical point, the headloss starts to increase curvalinearly, which is characteristic of removal by straining.

The relationship of the development of headloss across the filter medium to the accumulation of suspended solids in the medium was evaluated as follows. Suspended solids accumulation in the filter medium was calculated by using the influent/effluent turbidities versus time data shown in FIGS. 8A through 23A and the following mathematical relationship Suspended solids $(g/L) = 0.0023 \times$ Turbidity $(NTU)$ The suspended solids accumulation in the medium at any time is calculated by the following mass balance equation $$SS_{acc} = 0.0023 \Delta t \frac{Q}{V} \sum_{i=1}^{i=t/\Delta t} (Turb_{inf} - Turb_{eff})_i$$

where $SS_{acc}$=suspended solids accumulation at time t, g/m³
Q=filtration rate, L/min
V=volume of filter medium, m³
$\Delta t$=data collection frequency, min
$Turb_{inf}$=influent turbidity, NTU
$Turb_{eff}$=effluent turbidity, NTU
i=time index of the collected data The development of headloss with time is shown in FIGS. 8B through 23B. The corresponding development of headloss based on the amount of suspended solids retained within the filter is shown in FIGS. 8C through 23C.

It is also important to evaluate the quantity of backwash water that is used relative to the amount of water processed to determine the efficiency of the filter. Summary data on the operation of the filter as described, including backwash, water use, and water production are presented Table 3.

TABLE 3

| Run No. | Filtration rate | | Comp. ratio, % | Back Wash water % | Total water produced | |
|---|---|---|---|---|---|---|
| | L/m²·min | gal/ft²·min | | | L/m²·d | gal/ft²·d |
| 1 | 205 | 5 | 0 | 4.1 | 289,000 | 7,083 |
| 2 | 205 | 5 | 15 | 4.1 | 289,000 | 7,083 |
| 3 | 205 | 5 | 30 | 4.1 | 289,000 | 7,083 |
| 4 | 205 | 5 | 40 | 4.1 | 289,000 | 7,083 |
| 5 | 410 | 10 | 0 | 2.1 | 578,000 | 14,170 |
| 6 | 410 | 10 | 15 | 2.1 | 578,000 | 14,170 |
| 7 | 410 | 10 | 30 | 2.1 | 578,000 | 14,170 |
| 8 | 410 | 10 | 40 | 3.1 | 572,000 | 14,020 |
| 9 | 820 | 20 | 0 | 1.1 | 1,156,200 | 28,340 |
| 10 | 820 | 20 | 15 | 1.7 | 1,139,800 | 27,940 |
| 11 | 820 | 20 | 30 | 2.0 | 1,131,600 | 27,735 |
| 12 | 820 | 20 | 40 | 2.8 | 1,115,200 | 27,333 |
| 13 | 1,230 | 30 | 0 | 1.8 | 1,685,100 | 41,300 |
| 14 | 1,230 | 30 | 15 | 1.8 | 1,672,800 | 41,000 |
| 15 | 1,230 | 30 | 30 | 3.1 | 1,629,750 | 39,950 |
| 16 | 1,230 | 30 | 40 | 5.4 | 1,500,600 | 36,780 |

Secondary effluent, which is used as the influent to the filter for tertiary treatment of wastewater, can be used as the backwash water. A backwash rate of 410 L/m²·min (10 gal/ft²·min) was observed to be sufficient to clean up the medium. The clean up operation of the filter medium took approximately 30 minutes, although shorter backwash cycle times should be achievable. The percentage of the total water used for backwashing the filter, as summarized in Table 3, was computed using the following expression:

$$\text{Backwash water, \%} = \frac{W_B}{W_F + W_B} \times 100$$

Where WB=water used for backwashing the filter
WF=total filtered water

The ability to reduce the amount of backwash water has significant cost implications with respect to sizing of the wastewater treatment process. Typical backwash percentage for most conventional effluent filters is from 6 to 15 percent, so significant economies are gained by practice of the invention described herein. It should also be noted that the filtration apparatus described in the Masuda et al. U.S. Pat. No. 5,248,415 typically required washing the filter media on a frequent basis at a full flow rate equivalent to the flowrate of the wastewater.

The filtration system described herein was evaluated with respect to the amount of water that was produced per day. Taking into account the water used for backwashing, the water production rate for various filtration rates and bed compression ratios is reported in the last two columns of Table 3. As shown, it is possible to produce 1,672,800 L/m²-day (41,000 gal/ft²·day) at a filtration rate of 1230 L/m²·min (30 gal/ft²·min) at a bed compression of 15 percent.

The ability to compress the filter medium is a significant factor in the operation of the filter of the invention as described. The porosity of the bed can be modified to meet the characteristics of the influent liquid. The porosity of the bed can be altered without significantly effecting filtration efficiency to delay the onset of an unacceptable headloss across the filter medium, thus further extending the useful life of the filter between backwashing cycles. Because the bed is so highly porous, significantly higher filtration rates can be used as compared to conventional granular medium filters which filter from 80 to 410 L/m²·min (2 to 10 gal/ft²·min). In contrast, filtration rates of from 820 to 1230 L/m²·min (20 to 30 gal/ft²·min) are achievable in the practice of the invention. The optimum filtration rate appears to be in the range of from 820 to 1230 L/m²·min (20 to 30 gal/ft²·min) at a bed compression of from about 15 to 30 percent. Effluent turbidity values of 2 NTU or lower can be achieved without chemical addition for influent turbidity values of up to approximately 8 NTU when the flow is between 820 to 1230 L/m²·min (20 to 30 gal/ft²·min) at a bed compression ration of from about 15 to 40 percent.

Secondary effluent can be used as the backwash water. A flowrate of 410 L/m²·min (10 gal/ft²·min) was observed to be sufficient to clean the filter medium. The percentage of backwash water required at filtration rates of 820 and 1230 L/m²·min (20 to 30 gal/ft²·min) and at bed compression values of between 20 and 30 percent varied from about 1.1 to 3.1 percent, which is extremely efficient by comparison with conventional technologies.

What is claimed is:

1. High rate depth filtration apparatus for removing suspended solids from liquids, said apparatus comprising:
   a) a filter housing having an axial flow direction therethrough for liquid;
   b) a first perforated panel fixedly secured in said housing transverse to said flow direction;
   c) a second perforated panel movably secured in said housing transverse to said flow direction and spaced from said first perforated panel;
   d) an influent liquid conduit located adjacent said fixed first panel, said influent conduit connected to a source of liquid having suspended solids therein;
   e) an effluent liquid conduit located adjacent said movable second panel thereby establishing said axial flow direction through said housing from said influent conduit to said effluent conduit;
   f) substantially spherical and compressible filtration media of individual, fibrous lumps of bundled, crimped fibers located between said first and second panels; and
   g) a piston for moving said second perforated panel toward and away from said fixed first panel to define:
      i) a fixed filter bed of said media compressed between said panels during filtration, said filter bed having a porosity gradient across the bed proceeding progressively from more porous to less porous in said axial flow direction; and
      ii) a cleaning chamber between said panels during washing wherein said second panel is moved away from said first panel to provide said media in an uncompressed condition for washing in said axial flow direction.

2. The high rate filtration apparatus of claim 1 wherein said effluent liquid conduit comprises a filtered liquid effluent conduit and a separate wash water effluent conduit.

3. The high rate filtration apparatus of claim 1 further comprising a distribution plenum located between said liquid influent conduit and said fixed first perforated panel, whereby liquid is evenly distributed through said first panel and into said filter bed.

4. The high rate filtration apparatus of claim 1 wherein said axial flow direction is upflow, said fixed first panel is located below said movable second panel, said influent liquid conduit is located below said fixed first panel, and said effluent liquid conduit is located above said movable second panel.

5. The high rate filtration apparatus of claim 4 further comprising a gas injection conduit located adjacent said first panel for supplying air to mechanically shear trapped solids from said media in said cleaning chamber.

6. The high rate filtration apparatus of claim 5 wherein said gas injection conduit comprises two air conduits whereby air injection is alternated between said two conduits to increase the mechanical effect of shearing trapped solids from said media.

7. The high rate filtration apparatus of claim 1 wherein collector size, effective pore size, and depth of said filter bed are adjustable by movement of said second panel as filtration proceeds, whereby head loss can be adjusted and filtration efficiency maintained during filtration by mechanically expanding said fixed bed.

8. The high rate filtration apparatus of claim 1 wherein said influent conduit is connected to said cleaning chamber and supplies liquid having suspended solids therein to said cleaning chamber for washing.

9. Up-flow high rate filtration apparatus for removing suspended solids from waste water, said apparatus comprising:
   a) a vertically oriented filter housing having a waste water influent conduit located in a lower portion thereof and separate filtered water and wash water effluent conduits located in an upper portion thereof, said conduits establishing an upward axial flow direction through said housing;

b) a first perforated panel fixedly secured in said housing above said influent waste water conduit and transverse to said axial flow direction;

c) a second perforated panel movably secured in said housing transverse to said axial flow direction, above said first panel and spaced therefrom, and below said filtered water and wash water effluent conduits;

d) a distribution plenum located between said influent waste water conduit and said fixed first perforated panel, whereby waste water is evenly distributed through said first panel in said axial flow direction;

e) substantially spherical and compressible filtration media of individual, fibrous lumps of bundled, crimped fibers located between said first and second panels;

g) a piston for moving said second perforated panel toward and away from said fixed first panel to define:
   i) a fixed filter bed of media compressed between said panels, said fixed filter bed having a porosity gradient across the bed proceeding progressively from more porous to less porous in said axial flow direction, wherein collector size, effective pore size, and depth of said filter bed are adjustable by movement of said second panel as filtration proceeds and whereby head loss can be adjusted and filtration efficiency maintained during filtration by mechanically expanding said fixed bed; and
   ii) a cleaning chamber between said panels during washing wherein said second panel is moved away from said first panel to provide said media in an uncompressed condition for washing; and h) a pair of air conduits located below said fixed first panel on opposite sides of said housing whereby air injection is alternated between said conduits into said cleaning chamber to increase the mechanical effect of shearing trapped solids from said media.

10. The up-flow high rate filtration apparatus of claim 9 wherein said waste water influent conduit is connected to said cleaning chamber and supplies waste water thereto for washing.

* * * * *